(12) United States Patent
Yoshihara et al.

(10) Patent No.: US 11,685,406 B2
(45) Date of Patent: Jun. 27, 2023

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Koichi Yoshihara, Wako (JP); Takashi Mine, Wako (JP); Yuki Kizumi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 135 days.

(21) Appl. No.: 17/170,929

(22) Filed: Feb. 9, 2021

(65) Prior Publication Data
US 2021/0253136 A1  Aug. 19, 2021

(30) Foreign Application Priority Data
Feb. 13, 2020 (JP) .................................. 2020-022750

(51) Int. Cl.
*B60W 60/00* (2020.01)
*B60W 30/095* (2012.01)
(Continued)

(52) U.S. Cl.
CPC .. *B60W 60/00274* (2020.02); *B60W 30/0956* (2013.01); *B60W 10/04* (2013.01);
(Continued)

(58) Field of Classification Search
CPC ...... B60W 10/04; B60W 10/18; B60W 10/20; B60W 30/095; B60W 30/09;
(Continued)

(56) References Cited

U.S. PATENT DOCUMENTS 9,248,834 B1* 2/2016 Ferguson .......... B60W 60/0027
2017/0031361 A1* 2/2017 Olson .............. B60W 30/0956
(Continued)

FOREIGN PATENT DOCUMENTS

JP  2017-045130  3/2017
JP  2018-103925  7/2018
(Continued)

OTHER PUBLICATIONS

Japanese Office Action for Japanese Patent Application No. 2020-022750 dated Jun. 28, 2022.
(Continued)

*Primary Examiner* — Russell Frejd
*Assistant Examiner* — Brandon Z Willis
(74) *Attorney, Agent, or Firm* — Amin, Turocy & Watson, LLP

(57) ABSTRACT

A vehicle control device includes a recognizer configured to recognize a surrounding environment including a structure of a road near a vehicle and another vehicle, a deriver configured to derive a predicted probability that the other vehicle will travel in the future along each of routes which are assumed when a plurality of routes along which the other vehicle is able to travel are assumed on a road on which the other vehicle recognized by the recognizer travels, and a travel controller configured to control behavior of the vehicle based on the predicted probability derived by the deriver.

15 Claims, 16 Drawing Sheets

(51) Int. Cl.
  *B60W 10/04* (2006.01)
  *B60W 10/20* (2006.01)
  *B60W 10/18* (2012.01)
(52) U.S. Cl.
  CPC ............ *B60W 10/18* (2013.01); *B60W 10/20* (2013.01); *B60W 2420/42* (2013.01); *B60W 2420/52* (2013.01); *B60W 2552/00* (2020.02); *B60W 2554/4041* (2020.02); *B60W 2554/4042* (2020.02); *B60W 2554/4043* (2020.02); *B60W 2554/4045* (2020.02); *B60W 2554/4046* (2020.02); *B60W 2710/18* (2013.01); *B60W 2710/20* (2013.01)
(58) Field of Classification Search
  CPC ......... B60W 30/0956; B60W 30/0953; B60W 50/0097; B60W 2552/00; B60W 60/0027; B60W 60/00272; B60W 60/00274; B60W 2420/42; B60W 2420/52; B60W 2420/403; B60W 2554/4041; B60W 2554/4042; B60W 2554/4043; B60W 2554/4045; B60W 2554/4046; B60W 2710/18; B60W 2710/20
  See application file for complete search history.

(56) References Cited

U.S. PATENT DOCUMENTS

| | | | |
|---|---|---|---|
| 2019/0333373 A1 | 10/2019 | Fang et al. | |
| 2020/0164873 A1* | 5/2020 | Nanri | G06V 20/588 |
| 2020/0189581 A1* | 6/2020 | Yang | B60W 40/04 |
| 2020/0346644 A1* | 11/2020 | Schmeichel | B60W 30/12 |
| 2021/0094558 A1* | 4/2021 | Garcia | G06V 20/584 |

FOREIGN PATENT DOCUMENTS

| | | |
|---|---|---|
| JP | 2019-016104 | 1/2019 |
| JP | 2019-026183 | 2/2019 |
| JP | 2019-094044 | 6/2019 |
| WO | 2018/134973 | 7/2018 |
| WO | 2019/150525 | 8/2019 |

OTHER PUBLICATIONS

Japanese Office Action for Japanese Patent Application No. 2020-022750 dated Nov. 30, 2021.
Japanese Office Action for Japanese Patent Application No. 2020-022750 dated Jan. 10, 2023.

* cited by examiner

| No | ROAD STRUCTURE | DETAILS OF ROAD STRUCTURE | WEIGHT | LEFT TURN DIRECTION PROBABILITY | STRAIGHT DIRECTION PROBABILITY | RIGHT TURN DIRECTION PROBABILITY |
|---|---|---|---|---|---|---|
| 101 | SINGLE LANE | NEITHER RIGHT PATH NOR LEFT PATH IS PRESENT IN BASE PATH ALONG WHICH VEHICLE TRAVELS | W1 | B | A | B |
| 102 | RIGHT END OF MULTIPLE LANES | BASE PATH ALONG WHICH VEHICLE TRAVELS DOES NOT HAVE RIGHT PATH AND HAS LEFT PATH | W1 | B | A | C |
| 103 | IN MIDDLE OF MULTIPLE LANES | BASE PATH ALONG WHICH VEHICLE TRAVELS HAS RIGHT PATH AND LEFT PATH | W1 | B | A | B |
| 104 | LEFT END OF MULTIPLE LANES | BASE PATH ALONG WHICH VEHICLE TRAVELS HAS RIGHT PATH AND DOES NOT HAVE LEFT PATH | W1 | C | A | B |
| 105 | INTERSECTION | NEXT BASE PATH IS WITHIN PREDETERMINED DISTANCE FROM BASE PATH ALONG WHICH VEHICLE TRAVELS AND BRANCH POINT OF THREE BASE PATHS IS PRESENT | W1 | A | A | A |
| 106 | RIGHT TURN ONLY LANE | NEXT BASE PATH IS WITHIN PREDETERMINED DISTANCE FROM BASE PATH ALONG WHICH VEHICLE TRAVELS AND VEHICLE IS TRAVELING IN LANE IN WHICH "RIGHT TURN" IS ASSOCIATED WITH ATTRIBUTE OF BASE PATH IN FRONT OF VEHICLE | W1 | C | B | A |
| 107 | LEFT TURN ONLY LANE | NEXT BASE PATH IS WITHIN PREDETERMINED DISTANCE FROM BASE PATH ALONG WHICH VEHICLE TRAVELS AND VEHICLE IS TRAVELING IN LANE IN WHICH "LEFT TURN" IS ASSOCIATED WITH ATTRIBUTE OF BASE PATH IN FRONT OF VEHICLE | W1 | A | B | C |
| 108 | GO STRAIGHT /RIGHT TURN ONLY LANE | NEXT BASE PATH IS WITHIN PREDETERMINED DISTANCE FROM BASE PATH ALONG WHICH VEHICLE TRAVELS AND VEHICLE IS TRAVELING IN LANE IN WHICH "RIGHT TURN" IS ASSOCIATED WITH ATTRIBUTE OF BASE PATH IN FRONT OF VEHICLE AND "LEFT TURN" IS NOT ASSOCIATED THEREWITH | W1 | B | A | A |
| 109 | GO STRAIGHT /LEFT TURN ONLY LANE | NEXT BASE PATH IS WITHIN PREDETERMINED DISTANCE FROM BASE PATH ALONG WHICH VEHICLE TRAVELS AND VEHICLE IS TRAVELING IN LANE IN WHICH "LEFT TURN" IS ASSOCIATED WITH ATTRIBUTE OF BASE PATH IN FRONT OF VEHICLE AND "RIGHT TURN" IS NOT ASSOCIATED THEREWITH | W1 | A | A | B |
| 110 | RIGHT TURN ARROW SIGNAL | RIGHT TURN ARROW SIGNAL IS AT INTERSECTION ON BASE PATH | W1 | C | B | A |
| 111 | STRAIGHT ARROW SIGNAL | STRAIGHT ARROW SIGNAL IS AT INTERSECTION ON BASE PATH | W1 | C | A | C |
| 112 | LEFT TURN ARROW SIGNAL | LEFT TURN ARROW SIGNAL IS AT INTERSECTION ON BASE PATH | W1 | A | B | C |
| 113 | OTHERS | — | W1 | B | B | B |

| No | EVENT | CONTENT | WEIGHT | LEFT TURN DIRECTION PROBABILITY | STRAIGHT DIRECTION PROBABILITY | RIGHT TURN DIRECTION PROBABILITY |
|---|---|---|---|---|---|---|
| 201 | RIGHT DIRECTION INDICATOR | LAMP OF RIGHT DIRECTION INDICATOR IS BLINKING | W1 | C | B | A |
| 202 | LEFT DIRECTION INDICATOR | LAMP OF LEFT DIRECTION INDICATOR IS BLINKING | W1 | A | B | C |
| 203 | BRAKE LAMP | BRAKE LAMP IS BLINKING | W1 | B | B | B |
| 204 | OTHERS | — | W1 | B | B | B |

| No | EVENT | STATE | WEIGHT | LEFT TURN DIRECTION PROBABILITY | STRAIGHT DIRECTION PROBABILITY | RIGHT TURN DIRECTION PROBABILITY |
|---|---|---|---|---|---|---|
| 201 | RIGHT DIRECTION INDICATOR | LAMP OF RIGHT DIRECTION INDICATOR IS BLINKING | W1 | C | B | A |
| 202 | LEFT DIRECTION INDICATOR | LAMP OF LEFT DIRECTION INDICATOR IS BLINKING | W1 | A | B | C |
| 203 | BRAKE LAMP | BRAKE LAMP IS BLINKING | W1 | B | B | B |
| 211 | RIGHT DIRECTION INDICATOR (LANE CHANGE TO LEFT) | LANE CHANGE TO LEFT HAS BEEN MADE WHILE LAMP OF RIGHT DIRECTION INDICATOR IS BLINKING | W1 | C | B | A |
| 212 | RIGHT DIRECTION INDICATOR (LANE CHANGE TO RIGHT) | LANE CHANGE TO RIGHT HAS BEEN MADE WHILE LAMP OF RIGHT DIRECTION INDICATOR IS BLINKING | W1 | C | B | A |
| 213 | LEFT DIRECTION INDICATOR (LANE CHANGE TO LEFT) | LANE CHANGE TO LEFT HAS BEEN MADE WHILE LAMP OF LEFT DIRECTION INDICATOR IS BLINKING | W1 | A | B | C |
| 214 | LEFT DIRECTION INDICATOR (LANE CHANGE TO RIGHT) | LANE CHANGE TO RIGHT HAS BEEN MADE WHILE LAMP OF LEFT DIRECTION INDICATOR IS BLINKING | W1 | A | B | C |
| 215 | BRAKE LAMP (LANE CHANGE TO LEFT) | LANE CHANGE TO LEFT HAS BEEN MADE WHILE BRAKE LAMP IS BLINKING | W1 | A | B | B |
| 216 | BRAKE LAMP (LANE CHANGE TO RIGHT) | LANE CHANGE TO RIGHT HAS BEEN MADE WHILE BRAKE LAMP IS BLINKING | W1 | B | B | A |
| 217 | OTHERS | — | W1 | B | B | B |

| | WEIGHT | LEFT TURN DIRECTION PROBABILITY | STRAIGHT DIRECTION PROBABILITY | RIGHT TURN DIRECTION PROBABILITY |
|---|---|---|---|---|
| FIRST INDEX | W1 | C | B | A |
| SECOND INDEX | W1 | B | C | A |
| THIRD INDEX | W1 | C | A | B |
| TOTAL INDEX | | C | B | A |
| INTEGRATED INDEX | | c% | b% | a% |

FIG. 13

CHARACTERISTICS OF ROAD

178

| POSITION | ROAD STRUCTURE | FIRST INDEX WEIGHT | SECOND INDEX WEIGHT | THIRD INDEX WEIGHT |
|---|---|---|---|---|
| X1, Y1 | RIGHT TURN PROHIBITION | W1 | W2 | W3 |
| X1, Y1 | LEFT TURN ONLY LANE | W1 | W2 | W3 |
| X1, Y1 | RIGHT TURN/ GO STRAIGHT ONLY LANE | W3 | W1 | W2 |
| ⋮ | ⋮ | ⋮ | ⋮ | ⋮ |

|  | DEGREE OF ACCELERATION/DECELERATION GREATER THAN OR EQUAL TO THRESHOLD VALUE Th |
|---|---|
| COMPARATIVE EXAMPLE | HIGH |
| EMBODIMENT | LOW |

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2020-022750, filed Feb. 13, 2020, the content of which is incorporated herein by reference.

BACKGROUND

Field of the Invention

The present invention relates to a vehicle control device, a vehicle control method, and a storage medium.

Description of Related Art

Conventionally, a vehicle behavior prediction method of acquiring a traffic rule in a structure of a road including at least a lane near another vehicle and predicting a route along which the other vehicle will travel on the basis of the traffic rule has been disclosed (PCT International Publication No. WO 2018/134973 and Japanese Unexamined Patent Application, First Publication No. 2017-45130).

However, in the above-described vehicle behavior prediction method, it may not be possible to accurately predict a route along which another vehicle will travel.

SUMMARY

The present invention has been made in consideration of such circumstances and an objective of the present invention is to provide a vehicle control device, a vehicle control method, and a storage medium capable of more accurately predicting a route along which another vehicle will travel.

A vehicle control device, a vehicle control method, and a storage medium according to the present invention adopt the following configurations.

(1): According to an aspect of the present invention, a vehicle control device is provided including: a recognizer configured to recognize a surrounding environment including a structure of a road near a vehicle and another vehicle; a deriver configured to derive a predicted probability that the other vehicle will travel in the future along each of routes which are assumed when a plurality of routes along which the other vehicle is able to travel are assumed on a road on which the other vehicle recognized by the recognizer travels; and a travel controller configured to control behavior of the vehicle based on the predicted probability derived by the deriver.

(2): In the above-described aspect (1), the deriver derives the predicted probability based on a structure of the road on which the other vehicle is present, an explicit action explicitly indicated by the other vehicle, and an implicit action implicitly indicated by the other vehicle obtained from the surrounding environment recognized by the recognizer.

(3): In the above-described aspect (2), the deriver derives the predicted probability in consideration of superiority and inferiority associated with the structure of the road, the explicit action, and the implicit action.

(4): In the above-described aspect (2) or (3), the deriver sets superiority and inferiority associated with the structure of the road, the explicit action, and the implicit action based on characteristics of the road on which the other vehicle travels and derives the predicted probability in consideration of the set superiority and inferiority.

(5): In any one of the above-described aspects (2) to (4), the deriver derives the predicted probability by giving priority to the explicit action over the implicit action.

(6): In any one of the above-described aspects (2) to (5), the deriver derives the predicted probability by giving priority to the structure of the road over the explicit action.

(7): In any one of the above-described aspects (2) to (6), the deriver increases a degree of influence of the explicit action on the predicted probability when the other vehicle has taken the explicit action after making a lane change as compared with when the other vehicle has taken the explicit action without making a lane change.

(8): In any one of the above-described aspects (2) to (7), the structure of the road includes at least one of the presence or absence of an intersection near a road on which the vehicle is present, a type of lane of the road, and a type of sign provided on the road, the explicit action includes a control state of a direction indicator provided on the other vehicle or a combination of control of the direction indicator and the presence or absence of a lane change made by the other vehicle, and the implicit action includes at least one of a position, a velocity, and acceleration of the other vehicle.

(9): In any one of the above-described aspects (2) to (8), the plurality of routes include a first route along which the other vehicle goes straight and a second route along which the other vehicle turns left or right, the deriver derives a first predicted probability for the first route and a second predicted probability for the second route, and the travel controller controls the behavior of the vehicle based on the first predicted probability and the second predicted probability derived by the deriver.

(10): In any one of the above-described aspects (2) to (9), the plurality of routes include a first route along which the other vehicle goes straight and a third route along which the other vehicle makes a lane change, the deriver derives a first predicted probability for the first route and a third predicted probability for the third route, and the travel controller controls the behavior of the vehicle based on the first predicted probability and the third predicted probability derived by the deriver.

(11): In any one of the above-described aspects (1) to (10), the travel controller integrates behaviors of the vehicle according to behaviors of the other vehicle which are assumed based on the predicted probability derived by the deriver and controls the behavior of the vehicle based on the behaviors of the vehicle after the integration.

(12): According to an aspect of the present invention, a vehicle control method is provided including: recognizing, by a computer, a surrounding environment including a structure of a road near a vehicle and another vehicle; deriving, by the computer, a predicted probability that the other vehicle will travel in the future along each of routes which are assumed when a plurality of routes along which the other vehicle is able to travel are assumed on a road on which the other vehicle that has been recognized travels; and controlling, by the computer, behavior of the vehicle based on the derived predicted probability.

(13): According to an aspect of the present invention, a storage medium is provided storing a program for causing a computer to: recognize a surrounding environment including a structure of a road near a vehicle and another vehicle; derive a predicted probability that the other vehicle will travel in the future along each of routes which are assumed when a plurality of routes along which the other vehicle is able to travel are assumed on a road on which the other vehicle that has been recognized travels; and control behavior of the vehicle based on the derived predicted probability.

According to the above-described aspects (1) to (13), the vehicle control device can more accurately predict a route along which the other vehicle will travel by deriving the predicted probability that the other vehicle will travel in the future along each of the plurality of routes along which the other vehicle can travel. Further, the vehicle control device can cause the vehicle to travel more smoothly by controlling the behavior of the vehicle based on the predicted route.

According to the above-described aspect (3) or (4), the deriver can more accurately derive the predicted probability by deriving the predicted probability in consideration of the superiority and inferiority associated with the structure of the road, the explicit action, and the implicit action.

According to the above-described aspects (5) and (6), the deriver can more accurately derive the predicted probability by increasing a degree of reflection in the predicted probability in the order of the structure of the road, the explicit action, and the implicit action.

According to the above-described aspect (11), the travel controller can restrict a change in the behavior of the vehicle greater than or equal to a predetermined degree from occurring according to the behavior of the other vehicle by integrating the behaviors of the vehicle according to the behaviors of the other vehicle which are assumed based on the predicted probability and controlling the behavior of the vehicle based on the behaviors of the vehicle after the integration.

BRIEF DESCRIPTION OF THE DRAWINGS

FIG. 4 is a diagram showing an example of content of structural information.

FIG. 8 is a diagram showing an example of content of state information.

FIG. 9 is a diagram showing an example of content of state information.

FIG. 12 is a diagram for describing a process of deriving an integrated index.

FIG. 13 is a diagram showing an example of content of weight information.

DETAILED DESCRIPTION OF THE INVENTION

Hereinafter, embodiments of a vehicle control device, a vehicle control method, and a storage medium according to the present invention will be described with reference to the drawings.

[Overall Configuration]

Figure 1:
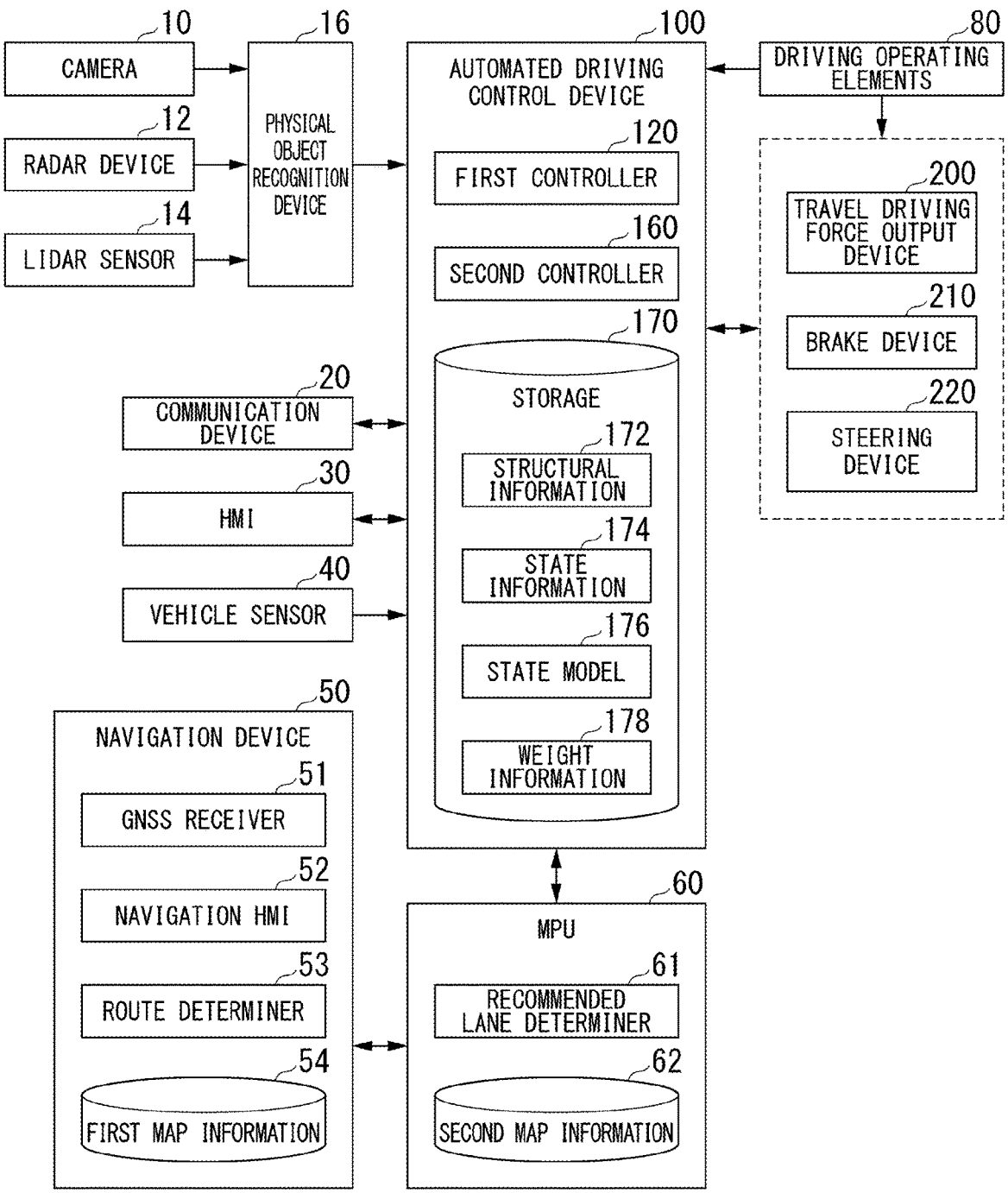
FIG. 1 is a configuration diagram of a vehicle system using a vehicle control device according to an embodiment.

FIG. 1 is a configuration diagram of a vehicle system 1 using a vehicle control device according to an embodiment. For example, a vehicle in which the vehicle system 1 is mounted is a two-wheeled vehicle, a three-wheeled vehicle, or a four-wheeled vehicle. A driving source of the vehicle is an internal combustion engine such as a diesel engine or a gasoline engine, an electric motor, or a combination thereof. The electric motor is operated using electric power generated by an electric power generator connected to the internal combustion engine or electric power with which a secondary cell or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, driving operating elements 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and parts of the configuration may be omitted or other configurations may be further added.

For example, the camera 10 is a digital camera using a solid-state imaging element such as a charge coupled device (CCD) or a complementary metal oxide semiconductor (CMOS). The camera 10 is attached to any location on the vehicle (hereinafter referred to as a vehicle M) in which the vehicle system 1 is mounted. When the view in front of the vehicle M is imaged, the camera 10 is attached to an upper part of a front windshield, a rear surface of a rearview mirror, or the like. For example, the camera 10 periodically and iteratively images the surroundings of the vehicle M. The camera 10 may be a stereo camera.

The radar device 12 radiates radio waves such as millimeter waves around the vehicle M and detects at least a position (a distance to and a direction) of a physical object by detecting radio waves (reflected waves) reflected by the physical object. The radar device 12 is attached to any location on the vehicle M. The radar device 12 may detect a position and speed of the physical object in a frequency modulated continuous wave (FM-CW) scheme.

The LIDAR sensor 14 radiates light (or electromagnetic waves having a wavelength close to light) to the vicinity of the vehicle M and measures scattered light. The LIDAR sensor 14 detects a distance to an object on the basis of time from light emission to light reception. The radiated light is, for example, pulsed laser light. The LIDAR sensor 14 is attached to any location on the vehicle M.

The physical object recognition device 16 performs a sensor fusion process on detection results from some or all of the camera 10, the radar device 12, and the LIDAR sensor 14 to recognize a position, a type, a speed, and the like of a physical object. The physical object recognition device 16 outputs recognition results to the automated driving control device 100. The physical object recognition device 16 may output detection results of the camera 10, the radar device 12, and the LIDAR sensor 14 to the automated driving control device 100 as they are. The physical object recognition device 16 may be omitted from the vehicle system 1.

The communication device 20 communicates with another vehicle present in the vicinity of the vehicle M, or communicates with various types of server devices via a radio base station, using, for example, a cellular network or a Wi-Fi network, Bluetooth (registered trademark), dedicated short range communication (DSRC), or the like.

The HMI 30 presents various types of information to an occupant of the vehicle M and receives an input operation by the occupant. The HMI 30 includes various types of display devices, a speaker, a buzzer, a touch panel, a switch, keys and the like.

The vehicle sensor 40 includes a vehicle speed sensor configured to detect the speed of the vehicle M, an acceleration sensor configured to detect acceleration, a yaw rate sensor configured to detect angular velocity around a vertical axis, a direction sensor configured to detect a direction of the vehicle M, and the like.

For example, the navigation device 50 includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of the vehicle M on the basis of a signal received from a GNSS satellite. The position of the vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route determiner 53 determines a route (hereinafter referred to as a route on a map) from the position of the vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include a curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane determiner 61 and stores second map information 62 in a storage device such as an HDD or a flash memory. The recommended lane determiner 61 divides the route on the map provided from the navigation device 50 into a plurality of blocks (for example, divides the route every 100 [m] in a traveling direction of the vehicle), and determines a recommended lane for each block with reference to the second map information 62. The recommended lane determiner 61 determines in what lane numbered from the left the vehicle will travel. The recommended lane determiner 61 determines the recommended lane so that the vehicle M can travel along a reasonable route for traveling to a branching destination when there is a branch point in the route on the map.

The second map information 62 is map information which has higher accuracy than the first map information 54. For example, the second map information 62 includes information about a center of a lane, information about a boundary of a lane, and the like. The second map information 62 may include road information, traffic regulations information, address information (an address/postal code), facility information, telephone number information, and the like. The second map information 62 may be updated at any time when the communication device 20 communicates with another device. The road information includes information about a road structure (for example, information about a type of lane, the number of lanes, road markings, traffic lights, signs, and road rules). The type of lane is information about a left turn only lane, which lane the vehicle is traveling in among a plurality of lanes, and the like.

For example, the driving operating elements 80 include an accelerator pedal, a brake pedal, a shift lever, a steering wheel, a steering wheel variant, a joystick, and other operators. A sensor configured to detect an amount of operation or the presence or absence of an operation is attached to the driving operating element 80, and a detection result thereof is output to the automated driving control device 100 or some or all of the travel driving force output device 200, the brake device 210, and the steering device 220.

The automated driving control device 100 includes, for example, a first controller 120, a second controller 160, and a storage 170. Each of the first controller 120 and the second controller 160 is implemented, for example, by a hardware processor such as a central processing unit (CPU) executing a program (software). Some or all of these components are implemented by hardware (a circuit including circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the automated driving control device 100 or may be stored in a removable storage medium such as a DVD or a CD-ROM and installed in the HDD or the flash memory of the automated driving control device 100 when the storage medium (the non-transitory storage medium) is mounted in a drive device. The storage 170 is implemented by a read only memory (ROM), a random access memory (RAM), a hard disk drive (HDD), a flash memory, or the like. The storage 170 stores, for example, structural information 172, state information 174, a state model 176, and weight information 178. Details of the above information will be described below. The automated driving control device 100 is an example of a "vehicle control device."

Figure 2:
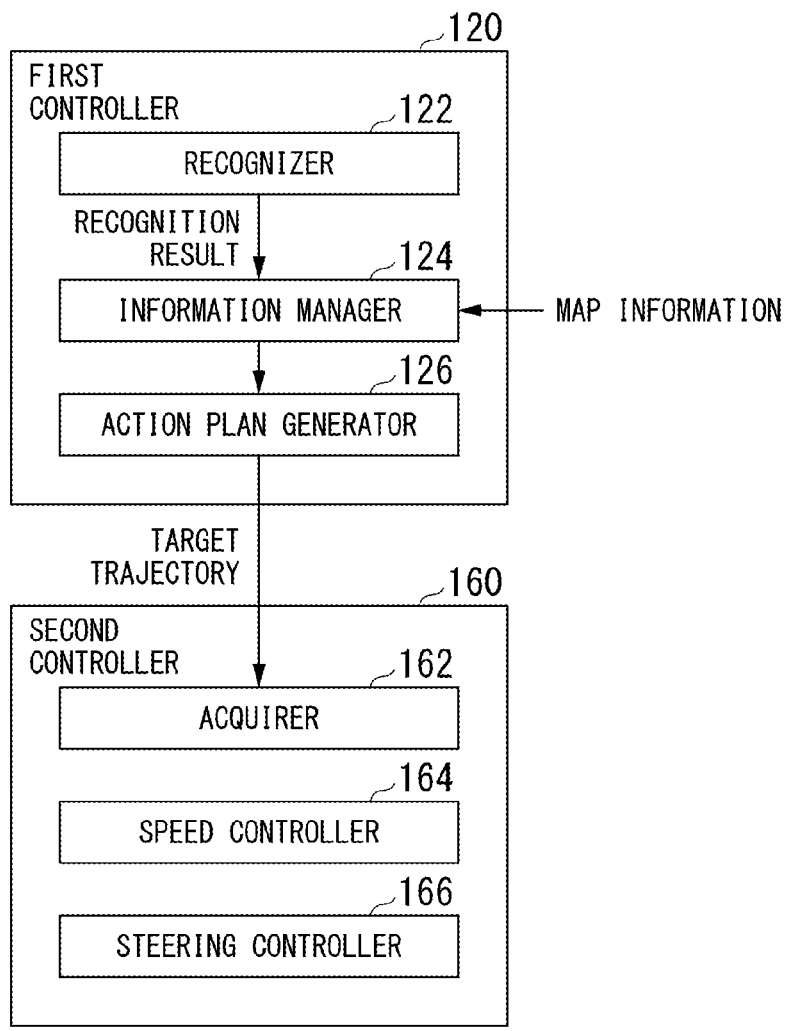
FIG. 2 is a functional configuration diagram of a first controller and a second controller.

FIG. 2 is a functional configuration diagram of the first controller 120 and the second controller 160. The first controller 120 includes, for example, a recognizer 122, an information manager 124, and the action plan generator 126.

For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing integrated evaluation by assigning scores to both the recognitions. Thereby, the reliability of automated driving is ensured.

The recognizer 122 recognizes states of a position, a velocity, acceleration, and the like of a physical object around the vehicle M on the basis of information input from the camera 10, the radar device 12, and the LIDAR sensor 14 via the physical object recognition device 16. For example, the position of the physical object is recognized as a position on absolute coordinates with a representative point (a center of gravity, a driving shaft center, or the like) of the vehicle M as the origin and is used for control. The position of the physical object may be represented by a representative point such as a center of gravity or a corner of the physical object or may be represented by a represented region. The "state" of a physical object may include acceleration or jerk of the physical object or an "action state" (for example, whether or not a lane change is being made or intended).

For example, the recognizer 122 recognizes a lane in which the vehicle M is traveling (a travel lane). For example, the recognizer 122 recognizes the travel lane by comparing a pattern of a road dividing line (for example, an arrangement of solid lines and broken lines) obtained from the second map information 62 with a pattern of road dividing lines in the vicinity of the vehicle M recognized from an image captured by the camera 10. The recognizer 122 may recognize a travel lane by recognizing a traveling path boundary (a road boundary) including a road dividing line, a road shoulder, a curb, a median strip, a guardrail, or the like as well as a road dividing line. In this recognition, a position of the vehicle M acquired from the navigation device 50 or a processing result of the INS may be added. The recognizer 122 recognizes a temporary stop line, an obstacle, red traffic light, a toll gate, and other road events.

When the travel lane is recognized, the recognizer 122 recognizes a position or orientation of the vehicle M with respect to the travel lane. For example, the recognizer 122 may recognize a gap of a reference point of the vehicle M from the center of the lane and an angle formed with respect to a line connecting the center of the lane in the traveling direction of the vehicle M as a relative position and orientation of the vehicle M related to the travel lane. Alternatively, the recognizer 122 may recognize a position of the reference point of the vehicle M related to one side end portion (a road dividing line or a road boundary) of the travel lane or the like as a relative position of the vehicle M related to the travel lane.

The information manager 124 acquires information for use in a process of the action plan generator 126. For example, the information manager 124 acquires the first map information 54, the second map information 62, the information stored in the storage 170, and a recognition result of the recognizer 122 and provides the acquired information to the action plan generator 126.

The action plan generator 126 generates a future target trajectory along which the vehicle M is allowed to automatedly travel (independently of a driver's operation) in the traveling aspect defined by the event so that the vehicle M can generally travel in the recommended lane determined by the recommended lane determiner 61 and further cope with a surrounding situation of the vehicle M. For example, the target trajectory includes a speed element. For example, the target trajectory is represented by sequentially arranging points (trajectory points) at which the vehicle M is required to arrive. The trajectory point is a point at which the vehicle M is required to arrive for each predetermined traveling distance (for example, about several meters [m]). On the other hand, a target speed and target acceleration for each predetermined sampling time period (for example, about several tenths of a second [sec]) are generated as parts of the target trajectory. The trajectory point may be a position at which the vehicle M is required to arrive at the sampling time for each predetermined sampling time period. In this case, information of the target speed or the target acceleration is represented by an interval between trajectory points.

The action plan generator 126 may set an automated driving event when the target trajectory is generated. Automated driving events include a constant-speed traveling event, a low-speed tracking traveling event, a lane change event, a branching event, a merging event, a takeover event, and the like. The action plan generator 126 generates a target trajectory according to an activated event. Details of the action plan generator 126 will be described below.

The second controller 160 controls the travel driving force output device 200, the brake device 210, and the steering device 220 so that the vehicle M passes through the target trajectory generated by the action plan generator 126 at a scheduled time.

The second controller 160 includes, for example, an acquirer 162, a speed controller 164, and a steering controller 166. The acquirer 162 acquires information of a target trajectory (trajectory points) generated by the action plan generator 126 and causes a memory (not shown) to store the acquired information. The speed controller 164 controls the travel driving force output device 200 or the brake device 210 on the basis of speed elements associated with the target trajectory stored in the memory. The steering controller 166 controls the steering device 220 in accordance with a degree of curvature of the target trajectory stored in the memory. For example, processes of the speed controller 164 and the steering controller 166 are implemented by a combination of feed-forward control and feedback control. As an example, the steering controller 166 executes feed-forward control according to the curvature of the road in front of the vehicle M and feedback control based on a deviation from the target trajectory in combination.

The travel driving force output device 200 outputs a travel driving force (torque) for enabling the vehicle to travel to driving wheels. For example, the travel driving force output device 200 may include a combination of an internal combustion engine, an electric motor, a transmission, and the like, and a power electronic control unit (ECU) that controls the internal combustion engine, the electric motor, the transmission, and the like. The ECU controls the above-described components in accordance with information input from the second controller 160 or information input from the driving operating element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operating element 80 so that brake torque according to a braking operation is output to each wheel. The brake device 210 may include a mechanism configured to transfer the hydraulic pressure generated by an operation of the brake pedal included in the driving operating elements 80 to the cylinder via a master cylinder as a backup. The brake device 210 is not limited to the above-described configuration and may be an electronically controlled hydraulic brake device configured to control the actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the driving operating element 80 to cause the direction of the steerable wheels to be changed.

[Details of Action Plan Generator]

Figure 3:
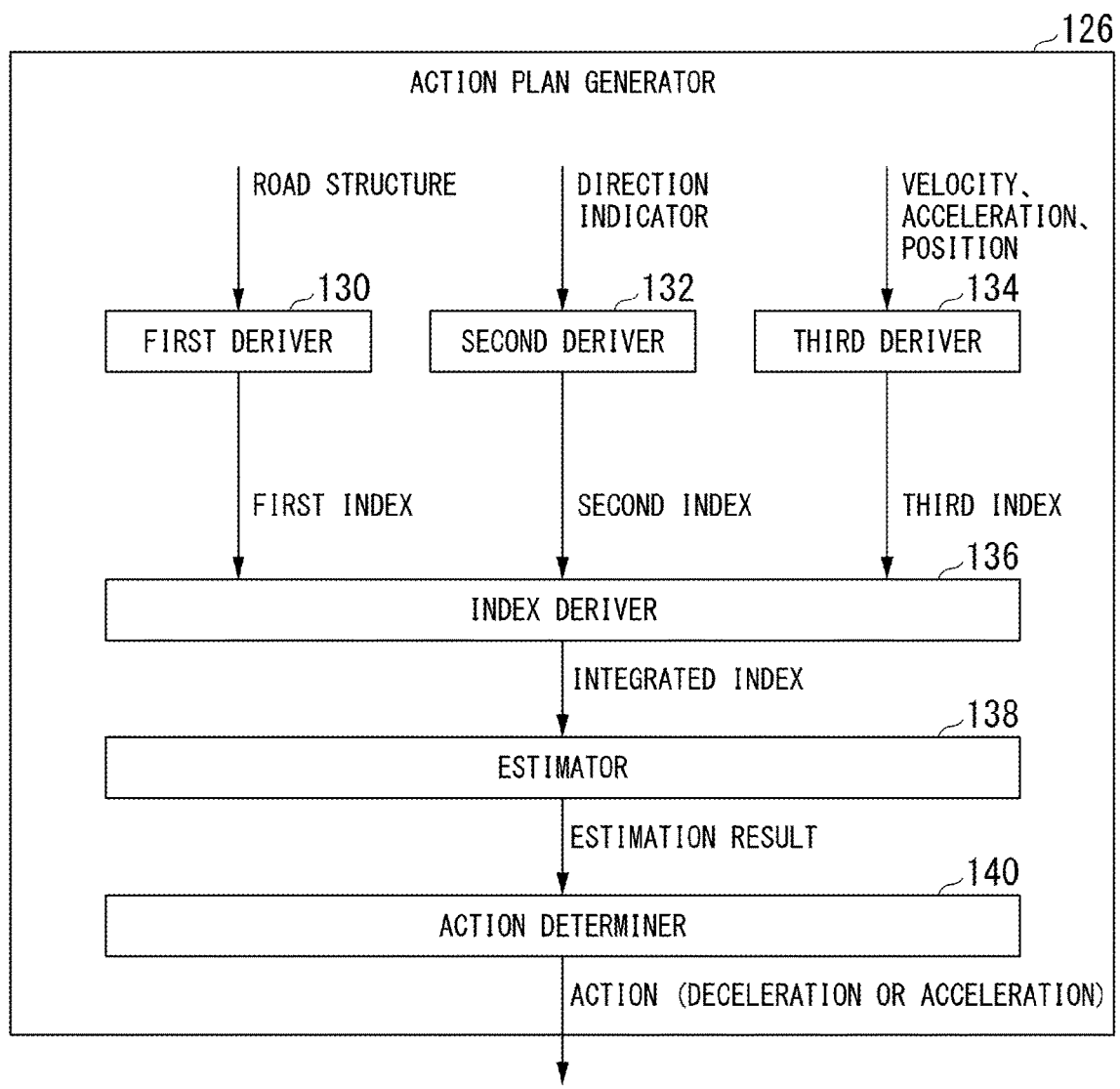
FIG. 3 is a diagram showing an example of a functional configuration of an action plan generator.

FIG. 3 is a diagram showing an example of a functional configuration of the action plan generator 126. The action plan generator 126 includes, for example, a first deriver 130, a second deriver 132, a third deriver 134, an index deriver (a deriver) 136, an estimator 138, and an action determiner 140.

The first deriver 130 derives a first index. The second deriver 132 derives a second index. The third deriver 134 derives a third index. The index deriver 136 derives a predicted probability on the basis of the first index, the second index, and the third index. The predicted probability is, for example, the predicted probability that the other vehicle will travel in the future along each of routes which are assumed when a plurality of routes along which the other vehicle is able to travel are assumed on the road on which the other vehicle travels. The estimator 138 estimates a traveling direction of the other vehicle on the basis of an integrated index. The action determiner 140 controls the vehicle on the basis of the estimated traveling direction (the predicted probability) of the other vehicle. Hereinafter, details of each functional part and an index derivation method will be described.

(Method of Deriving First Index)

The first deriver 130 derives the first index (a probability) on the basis of a structure of a road on which another vehicle is present. The first deriver 130 derives the first index on the basis of, for example, the structure of the road recognized by the recognizer 122 and the structural information 172. When the map information (the second map information 62) is associated with information indicating the structure of the road, the first deriver 130 may estimate a position where the other vehicle is present and identify the structure of the road associated with the estimated position in the map information.

FIG. 4 is a diagram showing an example of content of the structural information 172. The structural information 172 is information in which the structure of the road, details of the structure of the road, a weight for the probability, a probability that the other vehicle will travel in a left turn direction, a probability that the other vehicle will travel in a straight direction, and a probability that the other vehicle will travel in a right turn direction are associated with the identification information. In the example of FIG. 4, the probability is higher in the order of a probability A, a probability B, and a probability C. A sum of the probability A, the probability B, and the probability C is, for example, "1." In the example of FIG. 4, the weights associated with the structure of the road are shown to be the same, but weights of different magnitudes may be assigned. Details of weight assignment will be described below.

In FIG. 4 and FIGS. 8, 9, and 12 to be described below, "A," "B," and "C" are described. In FIGS. 4, 8, 9, and 12, "A," "B," and "C" indicate only trends and may have different values.

Figure 5:
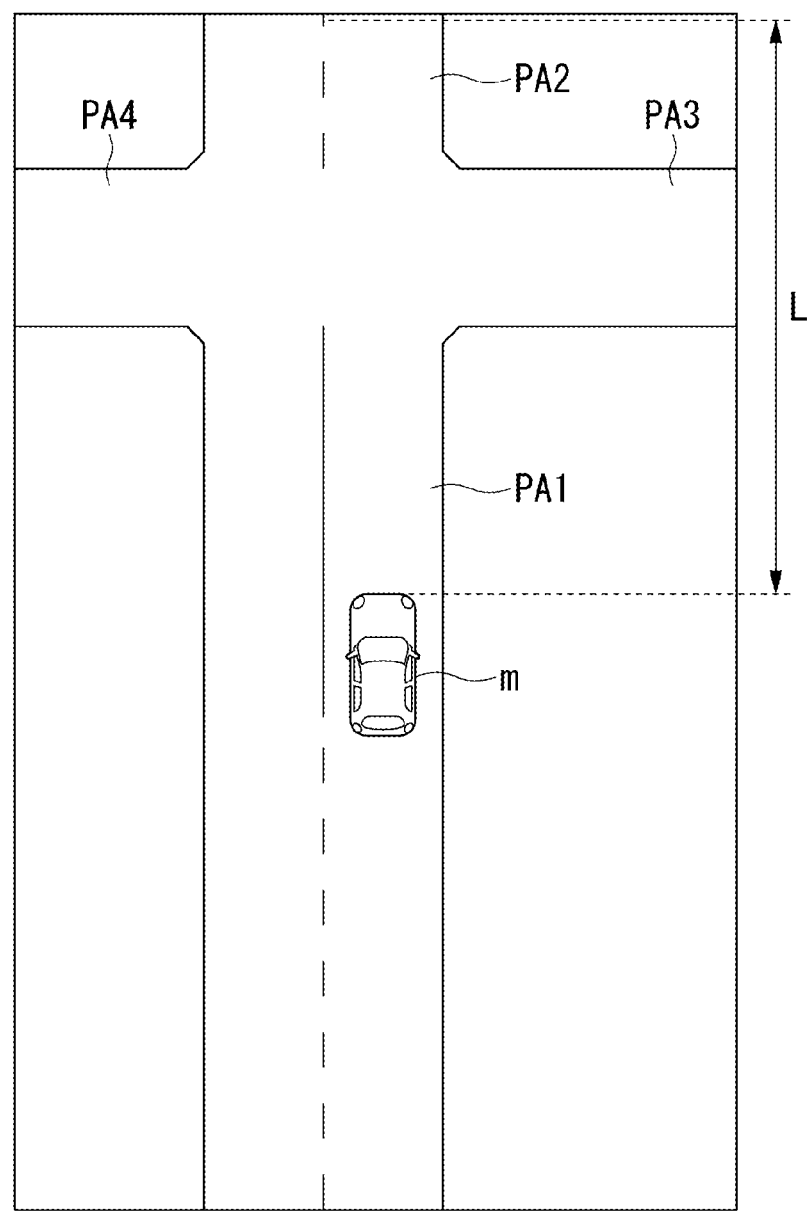
FIG. 5 is a diagram for describing identification of a road structure.

The first deriver 130 identifies a road structure that matches the structure of the road recognized by the recognizer 122 among road structures of the structural information 172. As shown in FIG. 5, the first deriver 130 determines that the structure of the road is an intersection when it is determined that the next base path PA2 is within a predetermined distance L of a base path PA1 along which another vehicle m travels and a branch point of three base paths (PA2 to PA4) is present on the basis of the recognition result of the recognizer 122.

Figure 6:
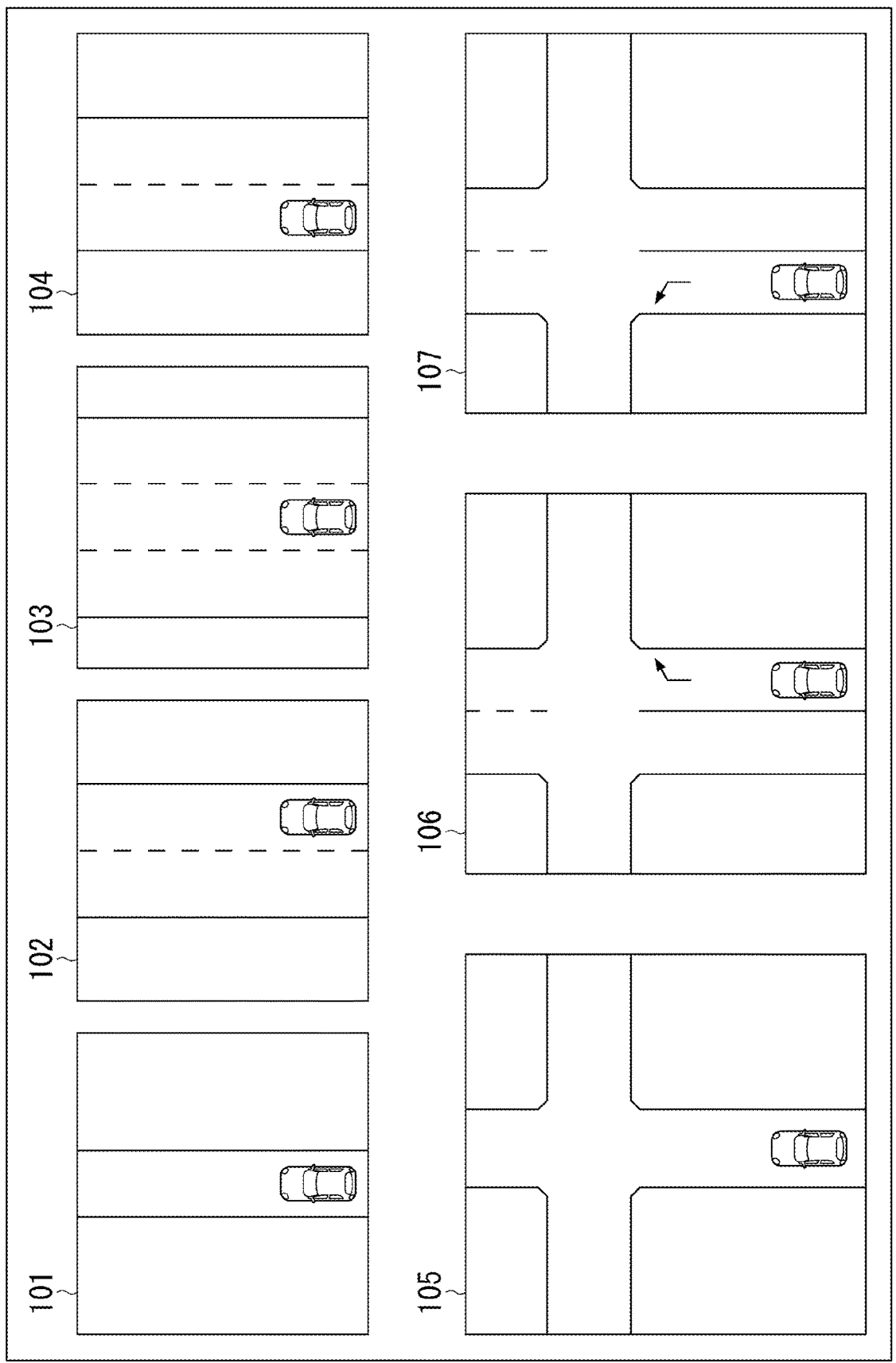
FIG. 6 is a diagram (part 1) for describing the road structure and details of the road structure.

The first deriver 130 derives a probability and a weight associated with the road structure identified in the structural information 172. For example, when it is determined that neither the right path nor the left path is present in the base path along which the other vehicle travels, the first deriver 130 determines that the road is a single lane and derives a probability associated with the single lane (see No. 101 in FIGS. 4 and 6). In the single lane, for example, a straight direction probability is highest and a left turn direction probability and a right turn direction probability are about the same. The "path" is a route along which another vehicle is estimated to be able to pass.

Hereinafter, road structures other than the single lane will be described with respect to details (specific examples) of the structure of the road on which another vehicle is present. The description on the left side of the semicolon is about the structure of the road on which another vehicle is present and the description on the right side of the semicolon is about details (a specific example) of the structure of the road.

Right end of multiple lanes; Case that the base path along which the vehicle travels does not have a right path and has a left path (see No. 102 in FIGS. 4 and 6). In this case, for example, the probability is higher in the order of the straight direction probability, the left turn direction probability (a probability of traveling in the left direction or a probability of traveling in the left lane), and the right turn direction probability (a probability of traveling in the right direction or a probability of traveling in the right lane).

In middle of multiple lanes; Case that the base path along which the vehicle travels has right and left paths (see No. 103 in FIGS. 4 and 6). In this case, for example, the straight direction probability is higher than the left turn direction probability and the right turn direction probability and the left turn direction probability and the right turn direction probability are about the same.

Left end of multiple lanes; Case that the base path along which the vehicle travels has a right path and does not have a left path (see No. 104 in FIGS. 4 and 6). In this case, for example, the probability is higher in the order of the straight direction probability, the right turn direction probability, and the left turn direction probability.

Intersection; Case that the next base path is within a predetermined distance from the base path along which the vehicle travels and a branch point of three base paths is present (see No. 105 in FIGS. 4 and 6). In this case, for example, the straight direction probability, the left turn direction probability, and the right turn direction probability are about the same.

Right turn only lane; Case that the next base path is within a predetermined distance from the base path along which the vehicle travels and the vehicle is traveling in a lane in which a "right turn" is associated with an attribute of the base path in front of the vehicle (see No. 106 in FIGS. 4 and 6). In this case, for example, the probability is higher in the order of the right turn direction probability, the straight direction probability, and the left turn direction probability.

For example, the first deriver 130 acquires the attribute associated with the base path (road) on the basis of the recognition result of the recognizer 122 or the information associated with the map information. The attribute is, for example, information about restrictions on road traffic rules. A probability of traveling in a direction in which a driver complies with road traffic restrictions (laws and regulations) is higher than a probability of traveling in a direction in which the driver does not comply with the above restrictions.

Left turn only lane; Case that the next base path is within a predetermined distance from the base path along which the vehicle travels and the vehicle is traveling in a lane in which a "left turn" is associated with the attribute of the base path in front of the vehicle (see No. 107 in FIGS. 4 and 6). In this case, for example, the probability is higher in the order of the left turn direction probability, the straight direction probability, and the right turn direction probability.

Figure 7:
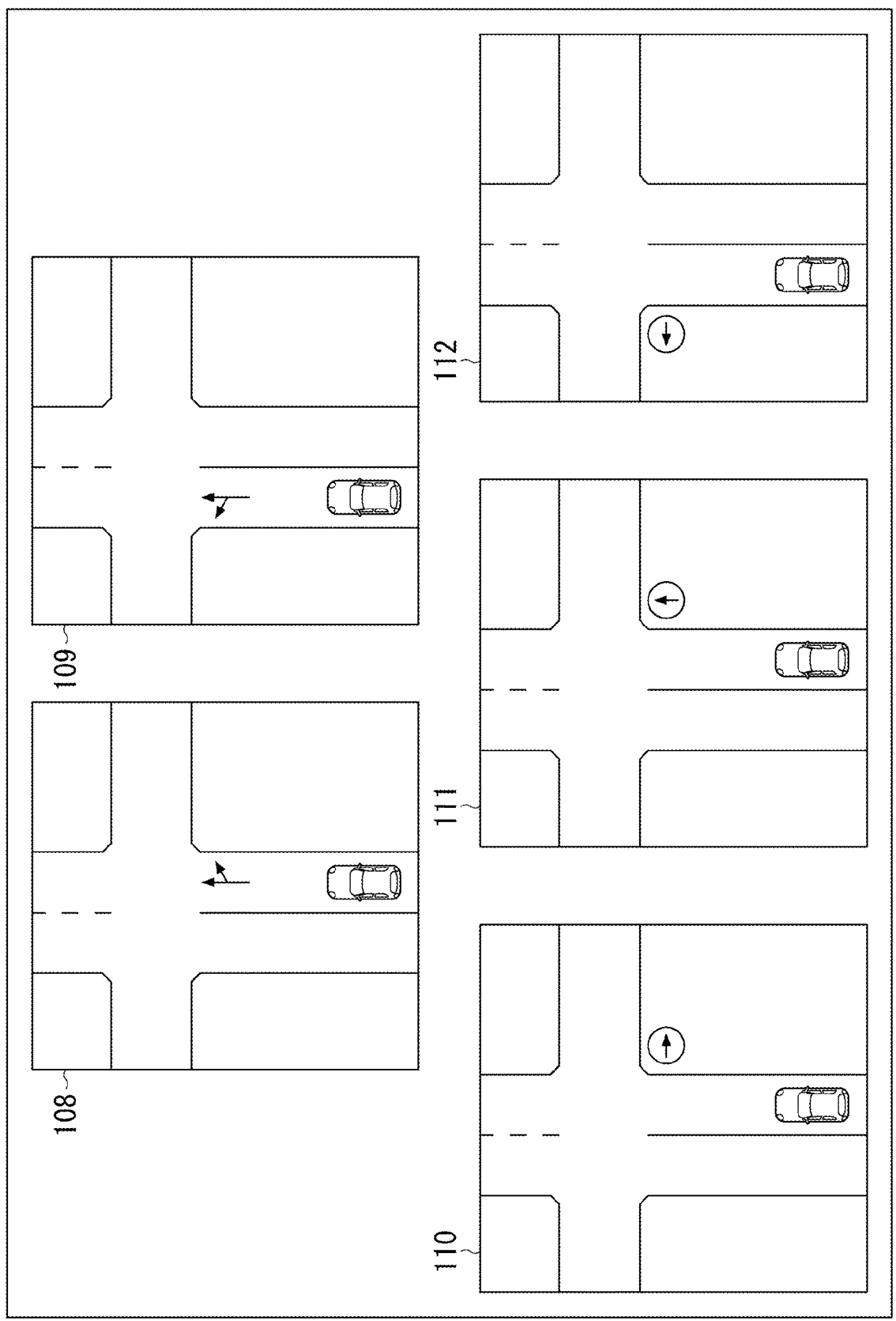
FIG. 7 is a diagram (part 2) for describing the road structure and the details of the road structure.

Go straight/right turn only lane; Case that the next base path is within a predetermined distance from the base path along which the vehicle travels and the vehicle is traveling in a lane in which a "right turn" is associated with the attribute of the base path in front of the vehicle and a "left turn" is not associated (going straight is associated) therewith (see No. 108 in FIGS. 4 and 7). In this case, for example, the straight direction probability and the right turn direction probability are about the same and are higher than the left turn direction probability.

Go straight/left turn only lane; Case that the next base path is within a predetermined distance of the base path along which the vehicle travels and the vehicle is traveling in a lane in which the "left turn" is associated with the attribute of the base path in front of the vehicle, and the "right turn" is not associated (going straight is associated) therewith (see No. 109 in FIGS. 4 and 7). In this case, for example, the straight direction probability and the left turn direction probability are about the same and are higher than the right turn direction probability.

Right turn arrow signal; Case that a right turn arrow signal is at an intersection on the base path within a predetermined distance from the base path (see No. 110 in FIGS. 4 and 7). In this case, for example, the probability is higher in the order of the right turn direction probability, the straight direction probability, and the left turn direction probability.

Straight arrow signal; Case that a straight arrow signal is at an intersection on the base path within a predetermined distance from the base path (see No. 111 in FIGS. 4 and 7). In this case, for example, the straight direction probability is higher than the right turn direction probability and the left turn direction probability and the right turn direction probability and the left turn direction probability are about the same.

Left turn arrow signal; Case that a left turn arrow signal is at an intersection on the base path within a predetermined distance from the base path (see No. 112 in FIGS. 4 and 7). In this case, for example, the probability is higher in the order of the left turn direction probability, the straight direction probability, and the right turn direction probability.

As described above, the first deriver 130 derives the probability (the first index) for the route on the basis of the structure of the road.

(Method of Deriving Second Index)

The second deriver 132 derives a second index (a probability) on the basis of the explicit action of the other vehicle. The explicit action is, for example, a direction indicated by the direction indicator or an ON state of a brake lamp. The explicit action may be an explicit action indicated by the vehicle or the occupant of the vehicle in addition to the direction indicated by the direction indicator and may be, for example, a gesture explicitly indicated by the occupant.

The second deriver 132 derives the second index on the basis of the explicit action of the other vehicle recognized by the recognizer 122 and the state information 174. FIG. 8 is a diagram showing an example of content of the state information 174. The state information 174 is information in which an event related to an explicit action, content of the event, a weight for a probability, a probability that the other vehicle will travel in a left turn direction, a probability that the other vehicle will travel in a straight direction, and a probability that the other vehicle will travel in a right turn direction are associated with the identification information. In the example of FIG. 8, the probability is higher in the order of a probability A, a probability B, and a probability C. A sum of the probability A, the probability B, and the probability C is, for example, "1."

The second deriver 132 identifies an event (content of the event) of the state information 174 that matches the explicit action of the other vehicle recognized by the recognizer 122 and derives a probability and a weight associated with the identified event. For example, the probability is higher in the order of the right turn direction probability, the straight direction probability, and the left turn direction probability when the lamp of the right direction indicator is blinking and the probability is higher in the order of the left turn direction probability, the straight direction probability, and the right turn direction probability when the lamp of the left direction indicator is blinking. When the brake lamp is blinking, the left turn direction probability, the straight direction probability, and the right turn direction probability are about the same.

The second deriver 132 may derive the probability using state information 174A instead of the state information 174. FIG. 9 is a diagram showing an example of content of the state information 174A. The state information 174A further includes the following content in addition to the content of the state information 174.

Figure 10:
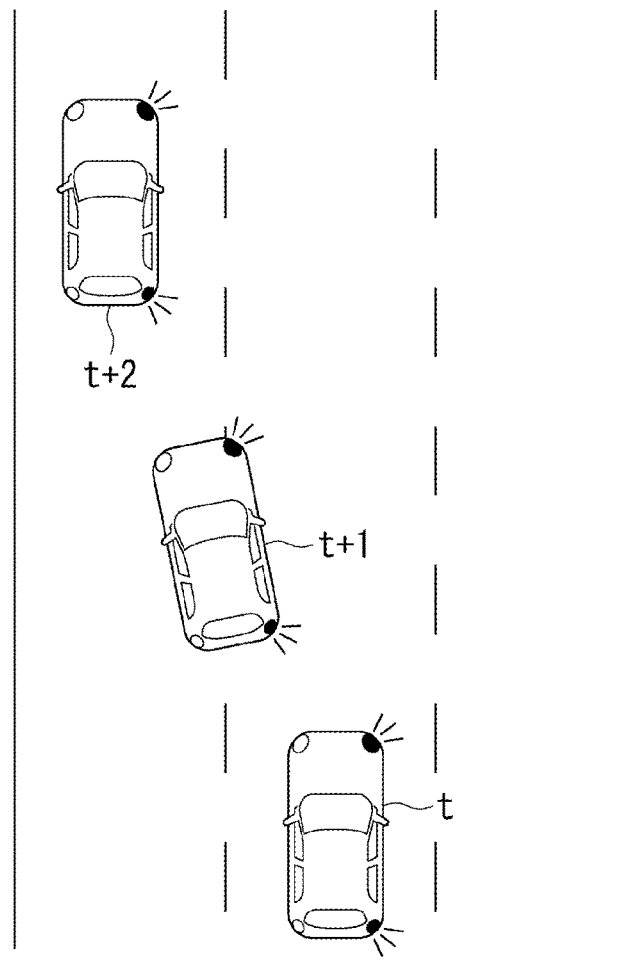
FIG. 10 is a diagram showing an example of a scene in which another vehicle has made a lane change to the left while blinking a lamp of a right direction indicator.

For example, when the other vehicle makes a lane change to the left while the right direction indicator of the other vehicle is blinking, for example, the probability is higher in the order of the right turn direction probability, the straight direction probability, and the left turn direction probability (see No. 211 of FIG. 9 and FIG. 10).

FIG. 10 is a diagram showing an example of a scene in which another vehicle makes a lane change to the left while the other vehicle is blinking the lamp of the right direction indicator. As shown in FIG. 10, when the other vehicle blinks the lamp of the right direction indicator at time t and makes the lane change to the left at time t+1 and time t+2, the second deriver 132 determines that the state corresponds to a state of No. 211 of FIG. 9 described above and, for example, derives the left turn direction probability "C," the straight direction probability "B," and the right turn direction probability "A."

For example, when the other vehicle makes a lane change to the right while the right direction indicator of the other vehicle is blinking, for example, the probability is higher in the order of the right turn direction probability, the straight direction probability, and the left turn direction probability (see No. 212 of FIG. 9).

For example, when the other vehicle makes a lane change to the left while the left direction indicator of the other vehicle is blinking, for example, the probability is higher in the order of the left turn direction probability, the straight direction probability, and the right turn direction probability (see No. 213 of FIG. 9).

For example, when the other vehicle makes a lane change to the right while the left direction indicator of the other vehicle is blinking, for example, the probability is higher in the order of the left turn direction probability, the straight direction probability, and the right turn direction probability (see No. 214 of FIG. 9).

For example, when the other vehicle makes a lane change to the left while the brake lamp of the other vehicle is blinking (or turned on), for example, the left turn direction probability is higher than the straight direction probability and the right turn direction probability, and the straight direction probability and the right turn direction probability are equivalent to each other (see No. 215 in FIG. 9).

For example, when the other vehicle makes a lane change to the right while the brake lamp of the other vehicle is blinking (or turned on), for example, the right turn direction probability is higher than the straight direction probability and the left turn direction probability, and the straight direction probability and the left turn direction probability are equivalent to each other (see No. 216 in FIG. 9).

In the case of an event other than the above, the left turn direction probability is equivalent to the straight direction probability and the right turn direction probability (see No. 217 in FIG. 9).

A weight associated with the above-described second index may differ according to each event. For example, the weight associated with an event in which the other vehicle takes an explicit action after the other vehicle makes the lane change is greater than the weight associated with an event in which the other vehicle takes an explicit action without making the lane change. For example, as in No. 212 and No. 213 of FIG. 9, the weight associated with the event in which the blinking state of the lamp of the direction indicator and the behavior of the other vehicle are not inconsistent is greater than the weights associated with the other events. The weight associated with the event in which the blinking state of the lamp of the direction indicator and the behavior of the other vehicle are inconsistent as in No. 211 and No. 214 in FIG. 9 is less than a weight associated with the event in which the direction indicator has simply blinked as in No. 201 or No. 202 in FIG. 9.

As described above, the second deriver 132 derives the probability (the second index) for the route on the basis of the state of the direction indicator recognized by the recognizer 122 and the state of the lane change of the other vehicle.

(Method of Deriving Third Index)

The third deriver 134 derives a third index (a probability) on the basis of the implicit action implicitly indicated by the other vehicle. The implicit action is, for example, an action different from an action in which the vehicle explicitly indicates a destination and is, for example, an action indicating the traveling state of the other vehicle. The implicit action is indicated by one or more information elements of a velocity of the other vehicle, acceleration of the other vehicle, and a position of the other vehicle. The position of the other vehicle is, for example, a position of the other vehicle with respect to the lane in which the other vehicle travels.

Figure 11:
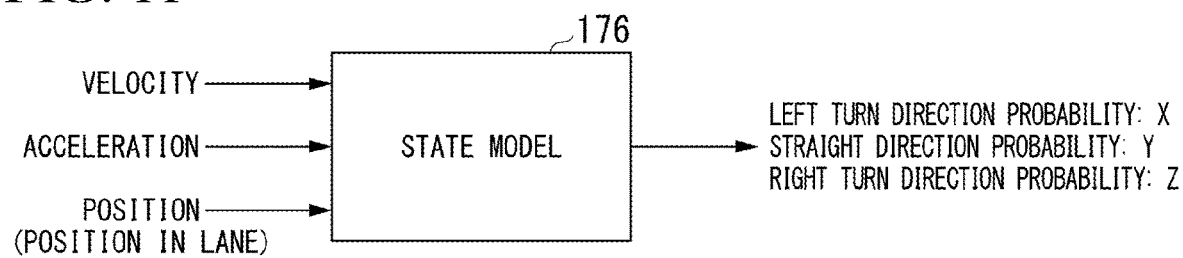
FIG. 11 is a conceptual diagram of processing of a state model.

The third deriver 134 derives the third index on the basis of the implicit action of the other vehicle recognized by the recognizer 122 and the state model 176. FIG. 11 is a conceptual diagram of processing of the state model 176. The state model 176 is a model for deriving a left turn direction probability, a straight direction probability, and a right turn direction probability when information indicating an implicit action of the other vehicle is input. The state model 176 is a learned model in which learning data has been learned. The learning data is a plurality of information elements in which information (a velocity, acceleration, and a position) indicating the implicit action of the other vehicle is associated with the third index. The state model 176 is a learned model learned to derive the third index associated with the input information when information indicating the implicit action of the other vehicle is input.

The state model 176 may be a model (a machine learning model) using a support vector machine or deep learning technology such as a neural network or may be a predetermined function.

Although a case in which the state model 176 derives the third index has been described in the above-described example, the action plan generator 126 may compare one or more information elements of a velocity, acceleration, and a position with preset information and derive the third index on the basis of a comparison result. For example, when the acceleration is higher than or equal to first predetermined acceleration and a distance between a reference position of the other vehicle and an adjacent lane is less than a second distance, the action plan generator 126 increases a probability that the vehicle will travel in the adjacent lane, subsequently increases a probability that the vehicle will travel in the lane in which the vehicle is currently traveling, and subsequently increases a probability that the vehicle will travel in an adjacent lane opposite to the adjacent lane. That is, the third deriver 134 may derive the third index on the basis of a predetermined function or rule without using the model generated through the above-described machine learning.

Although a case in which the action plan generator 126 applies the information recognized by the recognizer 122 to information prepared in advance to derive the first index or the second index has been described in the above-described example, the action plan generator 126 may derive the first index or the second index using a model that uses a support vector machine or deep learning technology such as a neural network. For example, when an image, a road structure, or an index related to an explicit action is input, a model that outputs the first index or the second index may be used.

(Integrated Index Derivation Method)

The index deriver 136 derives an integrated index on the basis of the weight (superiority or inferiority) associated with each index, the first index, the second index, and the third index. The integrated index is a left turn direction probability, a straight direction probability, and a right turn direction probability obtained in consideration of the first index, the second index, and the third index.

FIG. 12 is a diagram for describing a process of deriving the integrated index. For example, the index deriver 136 derives a first total index obtained by summing left turn direction probabilities of first to third indices, a second total index obtained by summing straight direction probabilities of the first to third indices, and a third total index obtained by summing right turn direction probabilities of the first to third indices. Further, the index deriver 136 applies the first to third total indices to a predetermined function or model to derive the integrated index. For example, the index deriver 136 normalizes the first to third total indices using a softmax function and derives the left turn direction probability, the straight direction probability, and the right turn direction probability. In the example of FIG. 12, the integrated index is the left turn direction probability of "c %," the straight direction probability of "b %," and the right turn direction probability of "a %."

(Weight Setting Method)

Here, although a case in which a weight associated with the first index, the second index, or the third index is preset for each index has been described, the index deriver 136 may set weights of the first to third indices on the basis of characteristics of a road on which another vehicle travels. The characteristics of the road include a road structure or a combination of a location (a position) of the road and a structure of the road, the location of the road, restrictions (for example, laws and regulations) on the road on which the other vehicle is traveling, and the like. For example, the index deriver 136 may set the weight of the first index greater than the weights of the other indices when there are restrictions on the road and it is necessary for the other vehicle to travel in compliance with the restrictions. For example, this is because, when the other vehicle is traveling in a left turn only lane, the probability that the other vehicle will turn left is high regardless of the second index or the third index.

For example, the index deriver 136 may set the weight of each index with reference to weight information stored in the storage 170. FIG. 13 is a diagram showing an example of content of the weight information 178. In the example of FIG. 13, the weight information 178 is information associated with the weight of each index for each combination of the position of the road and the structure of the road (road characteristics). The weight information 178 is information generated on the basis of behavior of the vehicle traveling at the above position and a simulation result.

The index deriver 136 sets, for example, the weight of the first index greater than the weight of the second index and the weight of the third index. For example, when the trend of the weight of the first index and the trend of the weight of the second index or the trend of the weight of the third index conflict with each other, the index deriver 136 may set the weight of the first index greater than the weight of the second index or the weight of the third index. This is because the other vehicle is likely to take an action according to the characteristics of the structure of the road.

Instead of using (or in addition to) the weight information 178, the index deriver 136 may derive the weights for the first to third indices using rules, criteria, and functions set for each road characteristic.

The index deriver 136 may set the weight of the second index greater than the weight of the third index. For example, the index deriver 136 may set the weight of the second index greater than the weight of the third index when the trend of the weight of the second index and the trend of the weight of the third index conflict with each other. This is because, when the other vehicle indicates an intention of explicit action, the other vehicle has a high probability that an action, which matches the intention of the explicit action, will be taken regardless of the implicit action.

On a specific road, the weight of the third index may be greater than the weight of the first index or the weight of the second index. For example, this is because, on a specific road, there is a high probability that another vehicle will act in a trend that matches the third index regardless of the first index or the second index.

The index deriver 136 may set the weight of the second index greater than the weight of the first index or the weight of the third index when the other vehicle has taken a preset predetermined action. The predetermined action is prestored in, for example, the storage 170. The predetermined action is, for example, an action such as a first action of blinking the lamp of the right direction indicator after the other vehicle makes the lane change to the right turn only lane or a second action of blinking the lamp of the left direction indicator after the other vehicle makes the lane change to the right turn only lane. This is because the other vehicle, which has taken the first action, has a high probability of a right turn. This is because it is assumed that the other vehicle, which has taken the second action, erroneously entered the right turn only lane and there is a high probability that the vehicle will return to a lane before the lane change before entering an intersection.

(Method of Deriving Estimation Result)

Figure 14:
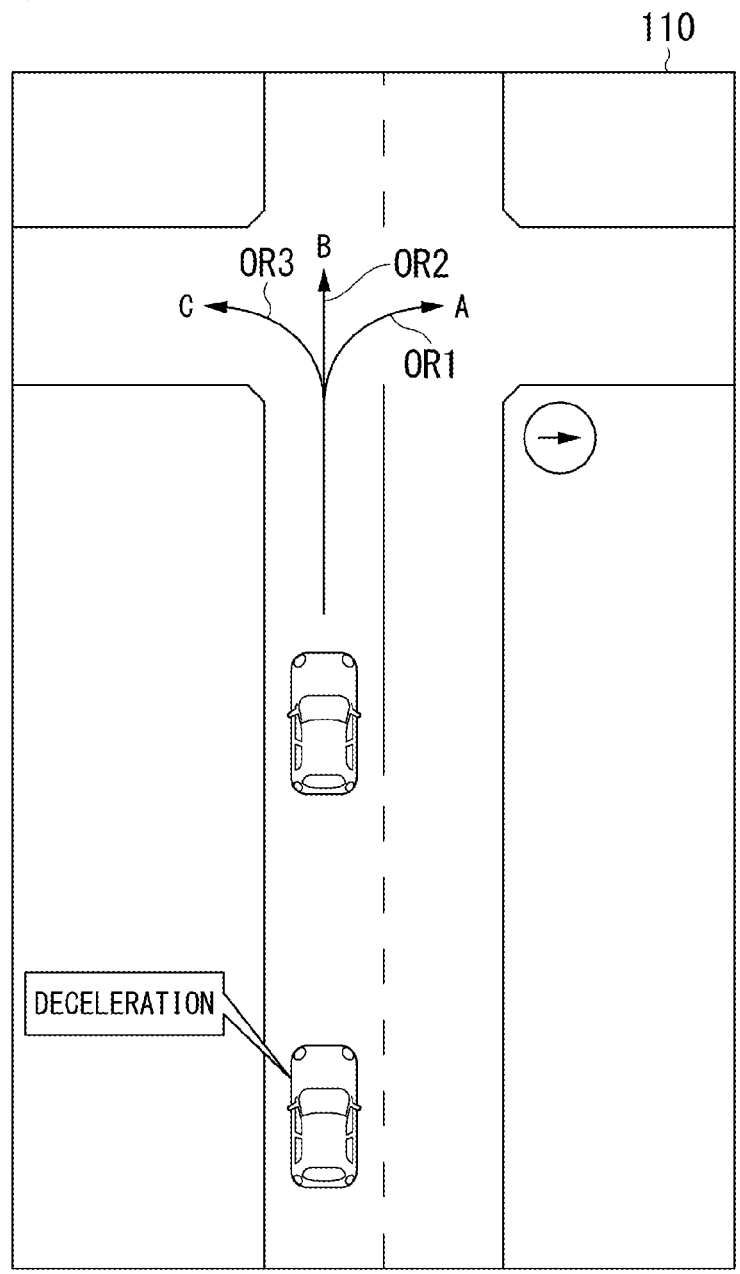
FIG. 14 is a diagram for describing a process of estimating a traveling direction of another vehicle.

The estimator 138 estimates a traveling direction of another vehicle on the basis of an integrated index. FIG. 14 is a diagram for describing a process of estimating the traveling direction of the other vehicle. The estimator 138 predicts a trajectory along which the other vehicle will travel on the basis of a road structure and a preset trajectory model. The trajectory model is a trajectory pattern in which another vehicle travels, which is preset for each road structure.

As shown in FIG. 14, when an intersection is in front of another vehicle m, the other vehicle m is predicted to travel along a trajectory such as a trajectory OR1 along which the other vehicle m goes straight toward the intersection and turns right at the intersection, a trajectory OR2 along which the other vehicle goes straight toward the intersection and passes through the intersection, or a trajectory OR3 along which the other vehicle goes straight toward the intersection and turns left at the intersection. In this manner, the trajectory pattern is preset on the basis of the structure of the road. The trajectory OR1 is associated with the right turn direction, the trajectory OR2 is associated with the straight direction, and the trajectory OR3 is associated with the left turn direction. Further, the position of the vehicle for each time is associated with each of these trajectories. The position of the vehicle for each time is a position of the vehicle based on experimental data, observation data, and simulation results. The observation data is data obtained by observing the trajectory of a vehicle which travels on a road structure.

The action determiner 140 determines an action of the vehicle M on the basis of an estimation result of the estimator 138. The action determiner 140 integrates behaviors of the vehicle according to the behaviors of the other vehicle which are assumed on the basis of the predicted probability and controls the behavior of the vehicle on the basis of the behaviors of the vehicle after the integration. For example, the action determiner 140 determines a velocity, acceleration, and a position of the vehicle on the basis of a position of another vehicle at each time. For example, the action determiner 140 derives the behavior of the vehicle for each traveling pattern in which the other vehicle travels on the basis of the trajectories OR1 to OR3. The action determiner 140 derives the behavior of the vehicle on the basis of an integrated index corresponding to the traveling pattern. For example, the action determiner 140 derives a reflection rate for the behavior of the vehicle on the basis of the integrated index for each traveling pattern and further determines the behavior of the vehicle on the basis of the derived reflection rate. For example, when an integrated index corresponding to the traveling pattern of the trajectory OR1 is greater than the integrated indices of the traveling patterns of the other trajectories, the reflection rate of the behavior of the vehicle according to the traveling pattern of the trajectory OR1 becomes greater than the reflection rates of the behaviors of the vehicle according to the traveling patterns of the other trajectories. Because it is predicted that the vehicle will decelerate in front of the intersection when the other vehicle has a traveling pattern of the trajectory OR1, the action determiner 140 causes the vehicle M to decelerate, for example, so that an inter-vehicle distance between the other vehicle and the vehicle is not less than or equal to a threshold value. The reflection rate is derived, for example, on the basis of a preset function or a predetermined statistical processing method.

Although a case in which a direction in which the other vehicle m will travel is mainly estimated when the other vehicle m approaches the intersection has been described in the above-described example, a probability that the other vehicle m will make a lane change to a lane in which the vehicle M travels may be derived on the basis of a concept similar to the above.

Figure 15:
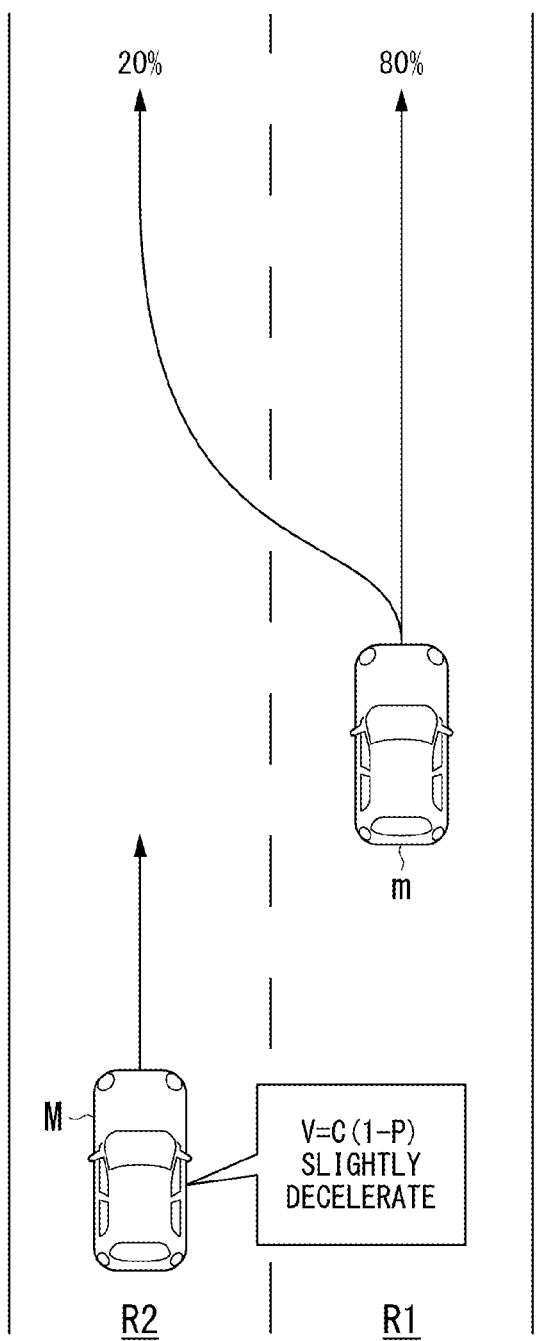
FIG. 15 is a diagram showing an example of vehicle behavior.

FIG. 15 is a diagram showing an example of behavior of the vehicle M. As shown in FIG. 15, the other vehicle m is traveling in a lane R1 and the vehicle M is traveling in a lane R2 (a lane adjacent to the lane R1). When a probability that the other vehicle m will go straight is at least a predetermined degree higher than a probability that the other vehicle m will enter the lane R2, the vehicle M travels while maintaining the behavior less than or equal to the preset threshold value. For example, the vehicle M travels while decelerating slightly (decelerating at deceleration less than that of FIG. 16 to be described below) in consideration of a probability of 20% that the other vehicle m will make the lane change. For example, the action determiner 140 determines a velocity of the vehicle M by applying a probability that the other vehicle m will travel in the lane R2 to a predetermined function. The predetermined function is, for example, a function for deriving a velocity such as Eq, (1). "V" denotes a velocity, "C" denotes a coefficient, and "P" denotes a probability.

$$V=C(1-P) \quad (1)$$

Figures 16, 17:
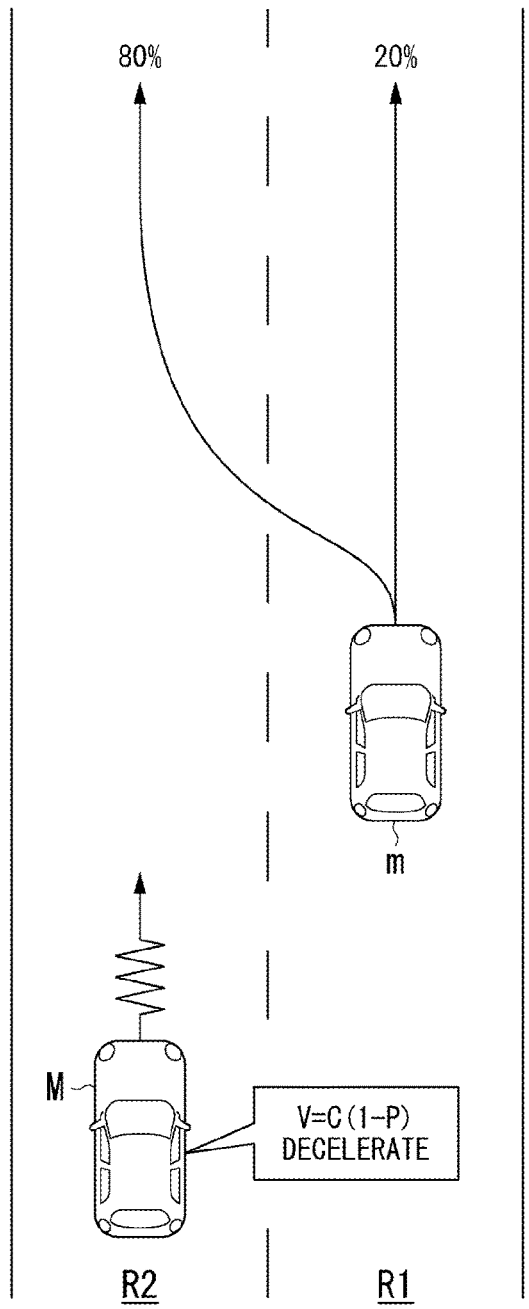
FIG. 16 is a diagram showing another example of vehicle behavior.
FIG. 17 is a diagram for comparing a degree of acceleration/deceleration of a vehicle of a comparative example with a degree of acceleration/deceleration of a vehicle M of the embodiment.

FIG. 16 is a diagram showing another example of the behavior of the vehicle M. As shown in FIG. 16, when a probability that the other vehicle m will enter the lane R2 is at least a predetermined degree higher than a probability that the other vehicle m will go straight, the vehicle M decelerates and travels in the lane R2.

FIG. 17 is a diagram for comparing a degree of acceleration or deceleration of a vehicle of a comparative example with a degree of acceleration or deceleration of the vehicle M of the embodiment. The vehicle of the comparative example is a vehicle that does not have a function of predicting a direction in which the other vehicle m will travel in the future or a lane in which the other vehicle m will travel in the future (or a vehicle that does not have an accurate prediction function), as compared with the vehicle M of the present embodiment. Because the vehicle of the comparative example travels without estimating a position of the other vehicle m in the future, if the other vehicle enters the lane in which the vehicle M is traveling or decelerates due to a right turn or a left turn, acceleration/deceleration greater than or equal to the threshold value may occur relatively frequently in accordance with the behavior of the other vehicle.

On the other hand, the vehicle M of the embodiment derives a predicted route along which the other vehicle will travel in the future for each of the plurality of routes along which the other vehicle is able to travel on the basis of the movement and intention of the other vehicle m in the future and further derives the behavior of the vehicle M according to each of the above-described plurality of routes. The vehicle M integrates behaviors of the vehicle M according to each of the plurality of routes of the other vehicle m on the basis of the predicted probability that the other vehicle m will travel in the future and determines the behavior of the vehicle M. Thereby, the vehicle M can increase a frequency of behavior less than or equal to the threshold value and decrease a frequency of behavior exceeding the threshold value. For example, the vehicle M can prevent acceleration or deceleration greater than or equal to a threshold value from occurring on the basis of the estimated behavior of the other vehicle before the other vehicle enters the lane in which the vehicle M travels or decelerates due to a right turn or a left turn. A frequency of acceleration or deceleration greater than or equal to a threshold value Th in the vehicle M is less than a frequency of acceleration or deceleration greater than or equal to the threshold value Th in the vehicle of the comparative example.

As described above, the action plan generator 126 can accurately predict a route along which the other vehicle m travels. Thereby, the vehicle M can travel more smoothly and the ride comfort of the vehicle M of the occupant can be improved.

The estimator 138 may estimate that there is a possibility that another vehicle will travel along a trajectory associated with a probability greater than or equal to a threshold value. For example, the estimator 138 may estimate that there is a probability of traveling along the trajectory OR1 or the trajectory OR2 when a probability of traveling along the trajectory OR3 associated with the left turn direction is less than the threshold value.

The action determiner 140 causes the vehicle M to travel on the basis of a trajectory in which a change in the behavior of the other vehicle m is larger in first behavior of the vehicle M when the other vehicle travels along the trajectory OR1 and second behavior of the vehicle M when the other vehicle travels along the trajectory OR2. For example, the trajectory OR1 is a trajectory along which the other vehicle m goes straight and the trajectory OR2 is a trajectory along which the other vehicle m turns left. In this case, the action plan generator 126 controls the vehicle M on the basis of the trajectory OR2 along which the other vehicle is predicted to decelerate when turning left.

In this manner, the automated driving control device 100 can improve the ride comfort of the vehicle M of the occupant by controlling the vehicle M so that the change in the acceleration of the vehicle M does not become large without limiting the behavior of the other vehicle m to one type of behavior. For example, the automated driving control device 100 predicts the behavior of the other vehicle m and controls the vehicle M in advance on the basis of a prediction result, thereby restricting the acceleration or deceleration of the vehicle M from becoming higher than or equal to a predetermined value. Because the automated driving control device 100 can determine a degree of the above-described restriction on the basis of a position of the other vehicle m after a predetermined time when the prediction has been performed, smoother control of the vehicle M can be implemented.

The action determiner 140 may determine the behavior of the vehicle on the basis of an amount of change in the behavior of the vehicle (its own vehicle) corresponding to a magnitude of the predicted probability. For example, when a predicted probability that another vehicle will travel along a predetermined route is OO %, the action determiner 140 may set behavior produced by multiplying an amount of change in the behavior of the vehicle corresponding to the behavior of the other vehicle when the other vehicle travels along a route of the predicted probability by OO % as final behavior of the vehicle.

For example, the estimator 138 may estimate that another vehicle will travel along the trajectory associated with the highest probability of the integrated index. In this case, the action determiner 140 determines the behavior of the vehicle M on the basis of a traveling pattern based on an estimated trajectory of the other vehicle.

[Flowchart]

Figure 18:
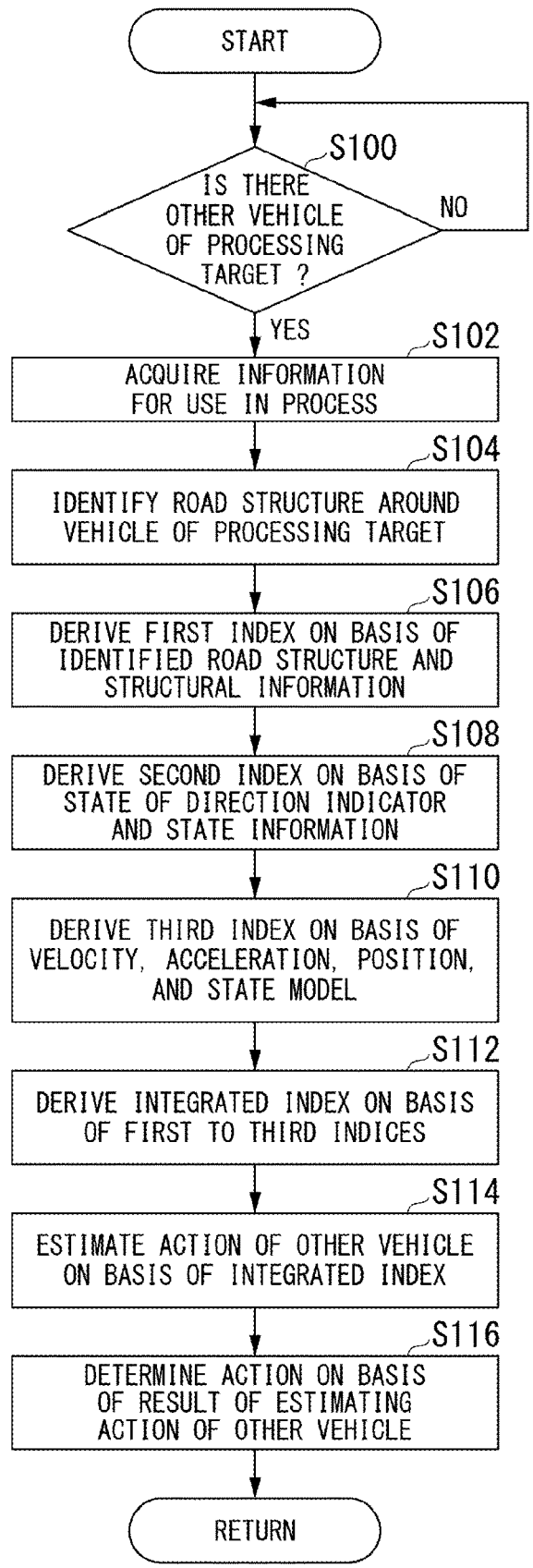
FIG. 18 is a flowchart showing an example of a flow of a process executed by an automated driving control device.

FIG. 18 is a flowchart showing an example of a flow of a process executed by the automated driving control device 100. The present process is executed, for example, at predetermined intervals.

First, the first controller 120 determines whether or not there is another vehicle of a processing target near the vehicle M (step S100). The other vehicle of the processing target is, for example, a vehicle within a predetermined distance from the vehicle M. More specifically, the other vehicle of the processing target is a vehicle that is in front of the vehicle M and is within the predetermined distance from the vehicle M.

When there is another vehicle of the processing target, the information manager 124 acquires information for use in the subsequent processing (step S102). The information for use in the subsequent processing is information for use in the process for deriving the above-described first to third indices.

Next, the action plan generator 126 identifies a road structure around the other vehicle of the processing target (step S104). Next, the first deriver 130 derives the first index on the basis of the identified road structure and the structural information 172 (step S106). Next, the second deriver 132 derives the second index on the basis of a state of the direction indicator and the state information 174 (step S108). Next, the third deriver 134 derives the third index on the basis of a velocity, acceleration, a position of the other vehicle, and the state model 176 (step S110).

Next, the index deriver 136 derives an integrated index on the basis of the first to third indices derived in steps S106 to S110 (step S112). Next, the estimator 138 estimates the behavior of the other vehicle on the basis of the integrated index derived in step S112 (step S114). Next, the action determiner 140 determines the action of the vehicle M on the basis of the action of the other vehicle estimated in step S114 (step S116). Thereby, the process of one routine of the present flowchart ends.

As described above, the automated driving control device 100 can predict a route along which the other vehicle will travel more accurately by deriving a predicted probability that the other vehicle will travel with respect to a plurality of routes. Further, the automated driving control device 100 can cause the vehicle to travel more smoothly by controlling the vehicle on the basis of the route along which the other vehicle will travel.

[Hardware Configuration]

Figure 19:
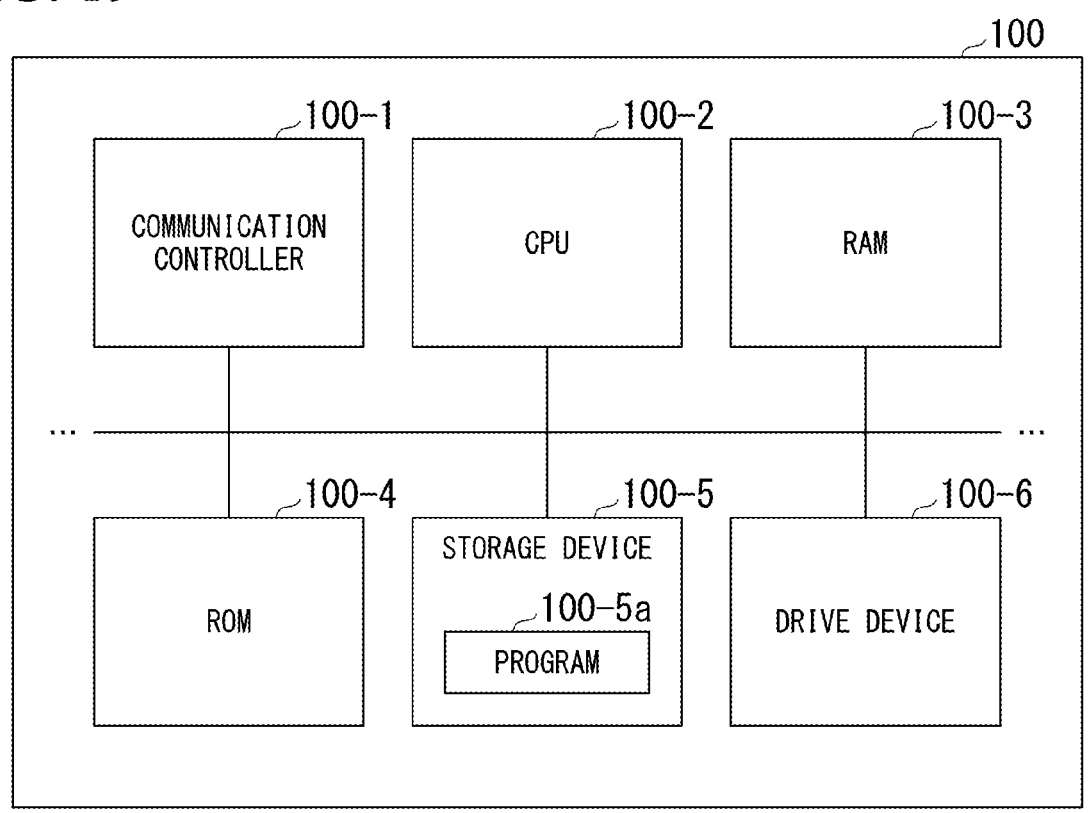
FIG. 19 is a diagram showing an example of a hardware configuration of the automated driving control device of the embodiment.

FIG. 19 is a diagram showing an example of a hardware configuration of the automated driving control device 100 according to the embodiment. As shown in FIG. 19, the automated driving control device 100 has a configuration in which a communication controller 100-1, a CPU 100-2, a RAM 100-3 used as a working memory, a ROM 100-4 storing a boot program and the like, a storage device 100-5 such as a flash memory or an HDD, a drive device 100-6, and the like are mutually connected by an internal bus or a dedicated communication line. The communication controller 100-1 communicates with components other than the automated driving control device 100. The storage device 100-5 stores a program 100-5a to be executed by the CPU 100-2. This program is loaded into the RAM 100-3 by a direct memory access (DMA) controller (not shown) or the like and executed by the CPU 100-2. Thereby, some or all of the recognizer 122, the information manager 124, and the action plan generator 126 are implemented.

The above-described embodiment can be implemented as follows.

A vehicle control device including:
a storage device storing a program; and
a hardware processor,
wherein the hardware processor executes the program stored in the storage device to:
recognize a surrounding environment including a structure of a road near a vehicle and another vehicle;
derive a predicted probability that the other vehicle will travel in the future along each of routes which are assumed when a plurality of routes along which the other vehicle is able to travel are assumed on a road on which the other vehicle that has been recognized travels; and
control behavior of the vehicle based on the derived predicted probability.

Although modes for carrying out the present invention have been described using embodiments, the present invention is not limited to the embodiments and various modifications and substitutions can also be made without departing from the scope and spirit of the present invention.

What is claimed is:

1. A vehicle control device comprising:
at least one memory storing instructions, and
at least one processor configured to execute the instructions to:
recognize a surrounding environment including a structure of a road near a vehicle and another vehicle;
derive a total predicted probability that the other vehicle will travel in the future along each of routes which are assumed when a plurality of routes along which the other vehicle is able to travel are assumed on a road on which the other vehicle travels; and
control behavior of the vehicle based on the total predicted probability,
wherein the routes which are assumed include a route A along which the other vehicle goes straight, a route B along which the other vehicle turns left, and a route C which the other vehicle turns right,
derive a first predicted probability, a second predicted probability, and a third predicted probability to each of the route A, the route B, and the route C, and
perform a statistic process using the first predicted probability, the second predicted probability, and the third predicted probability corresponding to each of the route A, the route B, and the route C to derive a predicted probability of the route A, a predicted probability of the route B, and a predicted probability of the route C, the first predicted probability includes a probability A1 of the route A, a probability B1 of the route B, and a probability C1 of the route C, derive the probability A1 of the route A, the probability B1 of the route B, and the probability C1 of the route C based on a probability information, the probability information is information in which the probability A1, the probability B1, and the probability C1 and each of a combination of a type of a structure of the road on which the other vehicle is present and a position of the other vehicle in the road are associated with each other, the second predicted probability includes a probability A2 of the route A, a probability B2 of the route B, and a probability C2 of the route C derived from an explicit action explicitly indicated by the other vehicle, the third predicted probability includes a probability A3 of the route A, a probability B3 of the route B, and a probability C3 of the route C derived from an implicit action implicitly indicated by the other vehicle obtained from the surrounding environment, control speed of the vehicle based on the predicted probability of the route A, the predicted probability of the route B, and the predicted probability of the route C.

2. The vehicle control device according to claim 1, wherein the at least one processor derives the total predicted probability based on a structure of the road on which the other vehicle is present, an explicit action explicitly indicated by the other vehicle, and an implicit action implicitly indicated by the other vehicle obtained from the surrounding environment.

3. The vehicle control device according to claim 2, wherein the at least one processor derives the total predicted probability in consideration of superiority and inferiority associated with the structure of the road, the explicit action, and the implicit action.

4. The vehicle control device according to claim 2, wherein the at least one processor sets superiority and inferiority associated with the structure of the road, the explicit action, and the implicit action based on characteristics of the road on which the other vehicle travels and derives the total predicted probability in consideration of the set superiority and inferiority.

5. The vehicle control device according to claim 2, wherein the at least one processor derives the total predicted probability by giving priority to the explicit action over the implicit action.

6. The vehicle control device according to claim 2, wherein the at least one processor derives the total predicted probability by giving priority to the structure of the road over the explicit action.

7. The vehicle control device according to claim 2, wherein the at least one processor increases a degree of influence of the explicit action on the total predicted probability when the other vehicle has taken the explicit action after making a lane change as compared with when the other vehicle has taken the explicit action without making a lane change.

8. The vehicle control device according to claim 2, wherein the structure of the road includes at least one of the presence or absence of an intersection near a road on which the vehicle is present, a type of lane of the road, and a type of sign provided on the road, wherein the explicit action includes a control state of a direction indicator provided on the other vehicle or a combination of control of the direction indicator and the presence or absence of a lane change made by the other vehicle, and wherein the implicit action includes at least one of a position, a velocity, and acceleration of the other vehicle.

9. The vehicle control device according to claim 2, wherein the plurality of routes include a first route along which the other vehicle goes straight and a second route along which the other vehicle turns left or right, wherein the at least one processor derives a first predicted probability for the first route and a second predicted probability for the second route, and controls the behavior of the vehicle based on the first predicted probability and the second predicted probability.

10. The vehicle control device according to claim 2, wherein the plurality of routes include a first route along which the other vehicle goes straight and a third route along which the other vehicle makes a lane change, wherein the at least one processor derives a first predicted probability for the first route and a third predicted probability for the third route, and controls the behavior of the vehicle based on the first predicted probability and the third predicted probability.

11. The vehicle control device according to claim 1, wherein the at least one processor integrates behaviors of the vehicle according to behaviors of the other vehicle which are assumed based on the total predicted probability and controls the behavior of the vehicle based on the behaviors of the vehicle after the integration.

12. The vehicle control device according to claim 1 wherein the position of the other vehicle in the road includes (1)-(5)

(1) the other vehicle is present in a single lane,
(2) the other vehicle is present in right end of multiple lanes,
(3) the other vehicle is present in a middle of multiple lanes,
(4) the other vehicle is present in left end of multiple lanes,
(5) the other vehicle is present in just before an intersection, the at least one processor configured to execute instructions to:

identify the structure of the road and the position of the other vehicle that the other vehicle is traveling, and identify the probability A1 of the route A, the probability B1 of the route B, and the probability C1 of the route C corresponding to identified structure of the road and the position of the other vehicle from the probability information to derive the probability A1 of the route A, the probability B1 of the route B, and the probability C1 of the route C.

13. The vehicle control device according to claim 1 the at least one processor configured to execute instructions to:

perform statistic process using the probability A1, B1 and C1 corresponding to the route A to derive the predicted probability of the route A, perform statistic process using the probability A2, B2 and C2 corresponding to the route B to derive the predicted probability of the route B, perform statistic process using the probability A3, B3 and C3 corresponding to the route C to derive the predicted probability of the route C, decrease speed of the vehicle based on the predicted probability of the route A, the predicted probability of the route B, and the predicted probability of the route C.

14. A vehicle control method comprising:

recognizing, by a computer, a surrounding environment including a structure of a road near a vehicle and another vehicle;

deriving, by the computer, a total predicted probability that the other vehicle will travel in the future along each of routes which are assumed when a plurality of routes along which the other vehicle is able to travel are assumed on a road on which the other vehicle that has been recognized travels; and controlling, by the computer, behavior of the vehicle based on the total predicted probability, wherein the routes which are assumed include a route A along which the other vehicle goes straight, a route B along which the other vehicle turns left, and a route C which the other vehicle turns right, derive, by the computer, a first predicted probability, a second predicted probability, and a third predicted probability to each of the route A, the route B, and the route C, and perform, by the computer, a statistic process using the first predicted probability, the second predicted probability, and the third predicted probability corresponding to each of the route A, the route B, and the route C to derive a predicted probability of the route A, a predicted probability of the route B, and a predicted probability of the route C, the first predicted probability includes a probability A1 of the route A, a probability B1 of the route B, and a probability C1 of the route C, derive, by the computer, the probability A1 of the route A, the probability B1 of the route B, and the probability C1 of the route C based on a probability information, the probability information is information in which the probability A1, the probability B1, and the probability C1 and each of a combination of a type of a structure of the road on which the other vehicle is present and a position of the other vehicle in the road are associated with each other, the second predicted probability includes a probability A2 of the route A, a probability B2 of the route B, and a probability C2 of the route C derived from an explicit action explicitly indicated by the other vehicle, the third predicted probability includes a probability A3 of the route A, a probability B3 of the route B, and a probability C3 of the route C derived from an implicit action implicitly indicated by the other vehicle obtained from the surrounding environment, control speed of the vehicle based on the predicted probability of the route A, the predicted probability of the route B, and the predicted probability of the route C.

15. A non-transitory storage medium storing a program for causing a computer to:

recognize a surrounding environment including a structure of a road near a vehicle and another vehicle;

derive a total predicted probability that the other vehicle will travel in the future along each of routes which are assumed when a plurality of routes along which the other vehicle is able to travel are assumed on a road on which the other vehicle that has been recognized travels; and control behavior of the vehicle based on the total predicted probability, wherein the routes which are assumed include a route A along which the other vehicle goes straight, a route B along which the other vehicle turns left, and a route C which the other vehicle turns right, derive a first predicted probability, a second predicted probability, and a third predicted probability to each of the route A, the route B, and the route C, and perform a statistic process using the first predicted probability, the second predicted probability, and the third predicted probability corresponding to each of the route A, the route B, and the route C to derive a predicted probability of the route A, a predicted probability of the route B, and a predicted probability of the route C, the first predicted probability includes a probability A1 of the route A, a probability B1 of the route B, and a probability C1 of the route C, derive the probability A1 of the route A, the probability B1 of the route B, and the probability C1 of the route C based on a probability information, the probability information is information in which the probability A1, the probability B1, and the probability C1 and each of a combination of a type of a structure of the road on which the other vehicle is present and a position of the other vehicle in the road are associated with each other, the second predicted probability includes a probability A2 of the route A, a probability B2 of the route B, and a probability C2 of the route C derived from an explicit action explicitly indicated by the other vehicle, the third predicted probability includes a probability A3 of the route A, a probability B3 of the route B, and a probability C3 of the route C derived from an implicit action implicitly indicated by the other vehicle obtained from the surrounding environment, control speed of the vehicle based on the predicted probability of the route A, the predicted probability of the route B, and the predicted probability of the route C.

* * * * *